(12) United States Patent
Berning et al.

(10) Patent No.: US 11,313,087 B2
(45) Date of Patent: Apr. 26, 2022

(54) EARTH WORKING MACHINE HAVING A ROTATABLE WORKING APPARATUS AXIALLY POSITIONALLY RETAINABLE WITH HIGH TIGHTENING TORQUE BY MEANS OF A CENTRAL BOLT ARRANGEMENT, AND METHOD FOR ESTABLISHING AND RELEASING SUCH RETENTION

(71) Applicant: Wirtgen GmbH, Windhagen (DE)

(72) Inventors: Christian Berning, Zülpich (DE); Karsten Buhr, Willroth (DE); Markus Frankemölle, Hennef (DE); Thomas Lehnert, Oberraden (DE); Andreas Salz, Neustadt (DE); Hardy Wilhelmi, Dattenberg (DE)

(73) Assignee: WIRTGEN GMBH

( * ) Notice: Subject to any disclaimer, the term of this patent is extended or adjusted under 35 U.S.C. 154(b) by 0 days.

(21) Appl. No.: 16/933,550

(22) Filed: Jul. 20, 2020

(65) Prior Publication Data

US 2020/0407927 A1    Dec. 31, 2020

Related U.S. Application Data

(63) Continuation of application No. 15/981,035, filed on May 16, 2018, now Pat. No. 10,724,188.

(30) Foreign Application Priority Data

May 23, 2017   (DE) ..................... 10 2017 208 780.3
Nov. 16, 2017   (DE) ..................... 10 2017 220 518.0

(51) Int. Cl.
*E01C 23/088*    (2006.01)
*E01C 23/12*    (2006.01)
(Continued)

(52) U.S. Cl.
CPC .......... *E01C 23/088* (2013.01); *E01C 23/127* (2013.01); *E21C 35/193* (2013.01);
(Continued)

(58) Field of Classification Search
CPC ...... F16D 41/061; F16D 7/028; E21C 23/088; E21C 23/127; E21C 25/08; E21C 25/10;
(Continued)

(56) References Cited

U.S. PATENT DOCUMENTS 2,908,337 A    10/1959   Surprise et al.
4,704,045 A    11/1987   Taylor et al.
(Continued)

FOREIGN PATENT DOCUMENTS

DE    3911947 A1    2/1990
DE    4037448 A1    5/1992
(Continued)

OTHER PUBLICATIONS

EPO Search dated Aug. 2, 2018 in related application EP 18 17 2040, 6 pages (not prior art).
(Continued)

*Primary Examiner* — Janine M Kreck
*Assistant Examiner* — Michael A Goodwin
(74) *Attorney, Agent, or Firm* — Lucian Wayne Beavers; Patterson Intellectual Property Law, PC

(57) ABSTRACT

A replaceable milling drum for an earth working machine includes a milling drum tube and a protrusion structure fixed to the milling drum tube. A bearing stem protrudes from the protrusion structure axially away from a drive axial end of the milling drum tube. The bearing stem has an outer surface including at least first and second cylindrical bearing surfaces axially spaced from each other, a furthest one of the cylindrical bearing surfaces from the drive axial end having a smaller diameter than a next furthest one of the cylindrical
(Continued)

bearing surfaces from the drive axial end, the bearing stem having a central opening therethrough co-axial with the drive axis.

20 Claims, 14 Drawing Sheets

(51) Int. Cl.
    *E21C 47/00*           (2006.01)
    *E21C 35/193*        (2006.01)
    *F16B 19/02*          (2006.01)
    *F16B 37/14*          (2006.01)
    *F16B 39/02*          (2006.01)

(52) U.S. Cl.
    CPC ............... *E21C 47/00* (2013.01); *F16B 19/02* (2013.01); *F16B 37/14* (2013.01); *F16B 39/02* (2013.01)

(58) Field of Classification Search
    CPC .......... E21C 27/02; E21C 27/24; E21C 31/02; E21C 31/12; E21C 35/193; E21C 47/00; E21C 47/02; F16B 19/02; F16B 37/14; F16B 39/02
    USPC ....... 172/107, 108, 122, 123, 125, 518, 527, 172/540, 554, 555
    See application file for complete search history.

(56) References Cited

U.S. PATENT DOCUMENTS

| | | | |
|---|---|---|---|
| 5,722,789 A | 3/1998 | Murray et al. | |
| 6,877,818 B1 * | 4/2005 | Gaertner | E01C 23/088 299/39.8 |
| 7,144,192 B2 * | 12/2006 | Holl | E01C 23/088 404/93 |
| 7,901,011 B2 | 3/2011 | Holl et al. | |
| 8,672,046 B2 | 3/2014 | Connell et al. | |
| 9,234,320 B2 | 1/2016 | Abresch et al. | |
| 10,724,186 B2 | 7/2020 | Berning et al. | |
| 10,724,187 B2 | 7/2020 | Berning et al. | |
| 2003/0137184 A1 * | 7/2003 | Clapham | E21C 35/23 299/81.1 |
| 2004/0232760 A1 | 11/2004 | Porter et al. | |
| 2007/0228806 A1 * | 10/2007 | Holl | B28D 1/186 299/39.4 |
| 2011/0148177 A1 * | 6/2011 | Busley | E01C 23/127 299/39.2 |
| 2011/0163589 A1 * | 7/2011 | Cipriani | E01C 23/088 299/39.2 |
| 2014/0333116 A1 | 11/2014 | Busley et al. | |
| 2014/0333118 A1 | 11/2014 | Abresch et al. | |

FOREIGN PATENT DOCUMENTS

| | | | | |
|---|---|---|---|---|
| DE | 102012008252 A1 * | 10/2013 | ........... | E01C 23/088 |
| DE | 102012008252 A1 | 10/2013 | | |
| DE | 102013208638 A1 | 11/2014 | | |
| EP | 1693587 A2 * | 8/2006 | ............. | F16D 7/028 |
| WO | WO-2010048967 A1 * | 5/2010 | ........... | E01C 23/088 |

OTHER PUBLICATIONS

EPO Extended Search dated Jul. 18, 2018 in related application EP 18 17 2039, 6 pages (not prior art).
EPO Search report dated Jul. 19, 2018 in corresponding application EP 18 172 042.6, 6 pages (not prior art).
EPO search report of Jul. 31, 2018 in corresponding EP application 018172044.2-1002 (not prior art).
English language machine translation of Roetsch et al., German Patent Publication No. DE 102012008252 A1, published Oct. 31, 2013 (16 pages) Year: 2013).

* cited by examiner

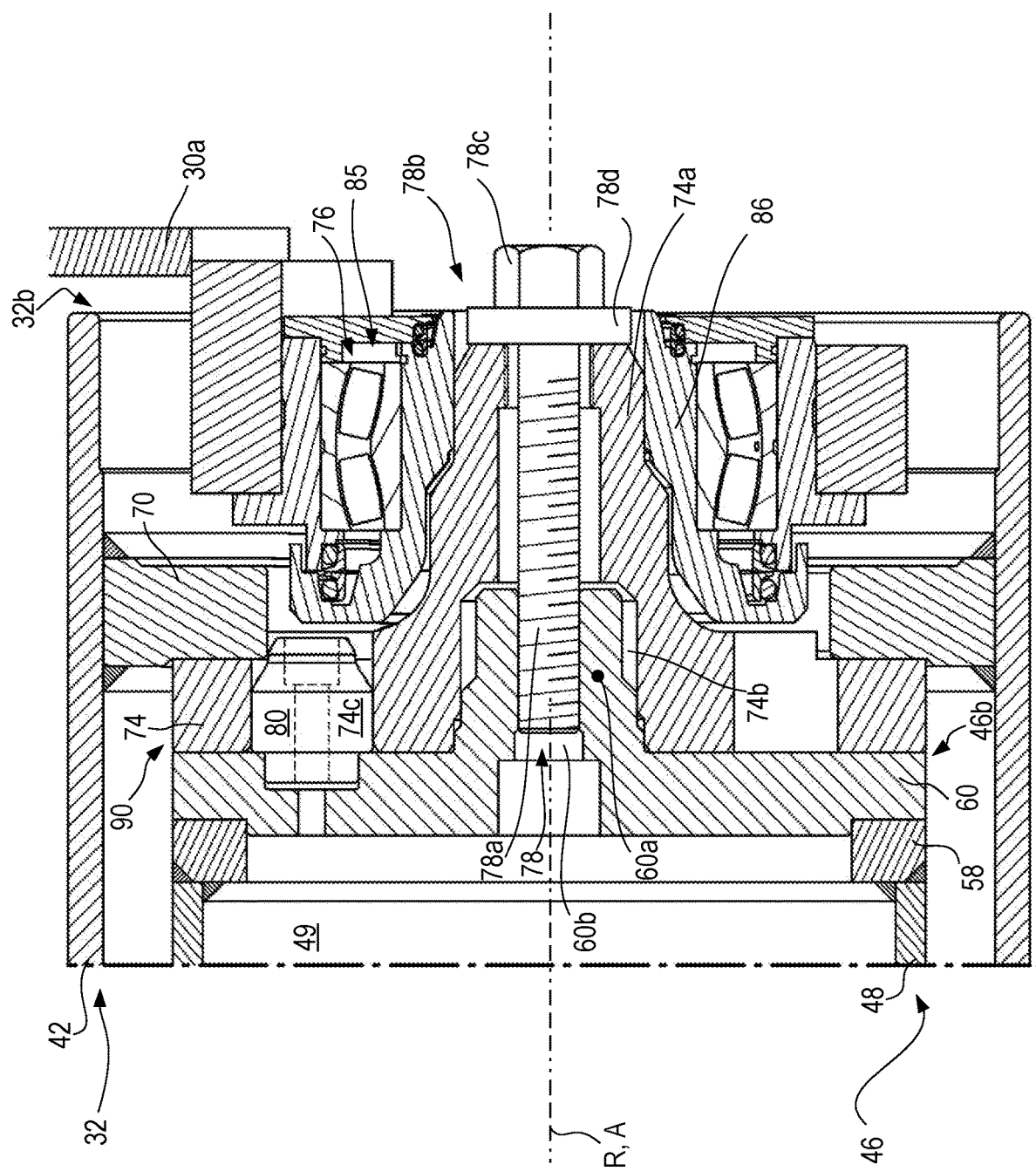
Fig. 3
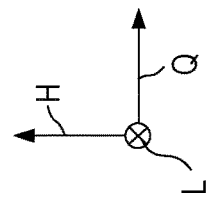

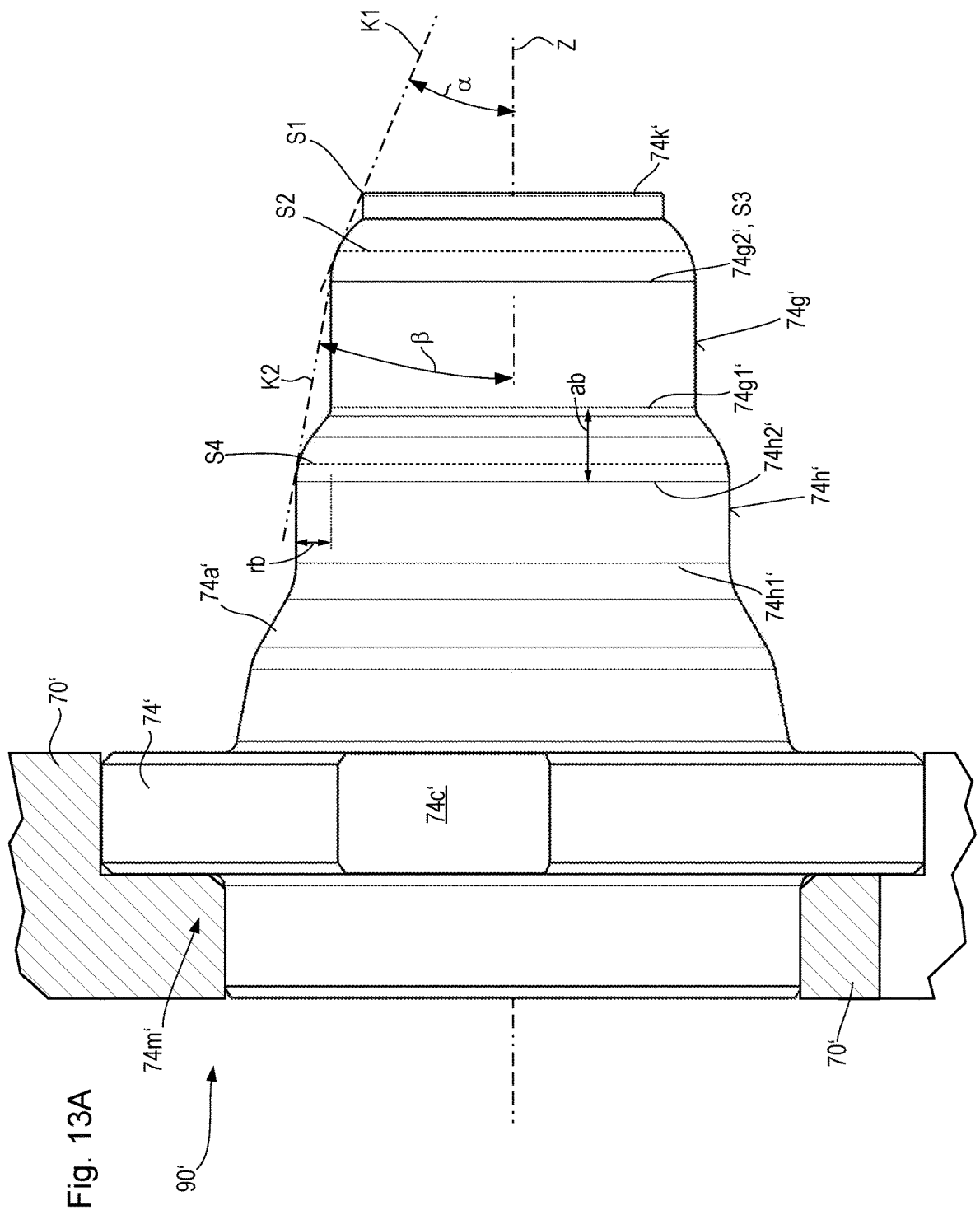

EARTH WORKING MACHINE HAVING A ROTATABLE WORKING APPARATUS AXIALLY POSITIONALLY RETAINABLE WITH HIGH TIGHTENING TORQUE BY MEANS OF A CENTRAL BOLT ARRANGEMENT, AND METHOD FOR ESTABLISHING AND RELEASING SUCH RETENTION

BACKGROUND OF THE INVENTION

The present invention relates to an earth working machine, such as a road milling machine, a recycler, a stabilizer, or a surface miner and the like. The earth working machine encompasses a machine body having a machine frame and a drive configuration rotationally drivable around a drive axis relative to the machine frame. The drive axis defines an axial direction. The earth working machine further encompasses a working apparatus for earth working to which the drive configuration is releasably connected in drive torque-transferring fashion for rotation together. The working apparatus extends axially between a drive axial end and a retention axial end located oppositely from the drive axial end, and radially externally surrounds the drive configuration of the earth working machine. The working apparatus is retained on the drive configuration, against axial displacement relative to the drive configuration, by way of a central bolt arrangement that is accessible in the region of its retention axial end and has a bolt axis collinear with the drive axis.

An earth working machine of this kind, in the form of an earth milling machine, is known from DE 10 2012 008 252 A1. This document discloses a milling drum constituting a working apparatus, which is retained in the region of its retention axial end by way of a threaded rod screwed at the end into the drive configuration, and a retaining nut in bolting engagement therewith. The milling drum of the known earth milling machine is pushed axially with the retaining nut against a tooth set in a region located closer to the drive axial end of the milling drum. A drive torque is transferrable by the tooth set from the drive configuration to the milling drum.

The axial positional retention of the milling drum relative to the drive configuration as known from DE 10 2012 008 252 A1 is disadvantageous in terms of its retaining effect. Because of the use of a threaded rod screwed at the end into the drive configuration and a retaining nut in bolting engagement with the threaded rod, upon release of axial positional retention is not possible to predict the point at which the bolt arrangement begins to loosen upon exertion of a loosening torque (release moment). On the one hand, the threaded rod together with the retaining nut can be unscrewed from the drive configuration as a bolt arrangement moving together; on the other hand, the retaining nut can move relative to the threaded rod so that the threaded rod constitutes, with the drive configuration, an arrangement which is connected for movement together and relative to which the retaining nut is movable.

Lastly, as a function of differences in friction conditions, caused e.g. by dirt, upon exertion of a release moment, both the one and the other situation can occur, so that in portions the threaded rod is unscrewed from the drive configuration, and in portions the retaining nut is moved relative to the threaded rod. In either case, exertion of a loosening torque does not result in an unequivocally predictable machine state.

The same can be true, mutatis mutandis, for a tightening torque (tightening moment) in a retaining direction, although the possibility that exists here, in contrast to loosening, is firstly to screw in the threaded rod and only then bolt on the retaining nut.

In addition, because of the dimensions of the known retaining nut, the torque that can be exerted on the bolt arrangement of the known milling drum upon tightening and loosening using conventional tools, for example a torque wrench, is limited. It is noteworthy here that earth-removing working apparatuses in particular are exposed, while being operated as intended, to very large force inputs that an axial positional retention system must withstand. Reliable establishment, and also reliable release, of axial positional retention for a working apparatus of an earth working machine is therefore the focus of the present Application.

The present invention therefore also relates to a method for establishing or releasing axial positional retention of a working apparatus of an earth working machine on a drive configuration of the earth working machine, in particular of the earth working machine recited above. The drive configuration is rotatable around a drive axis relative to a machine frame of the earth working machine. The working apparatus radially externally surrounds the drive configuration, axial positional retention being effected by a central bolt arrangement having a bolt axis collinear with the drive axis.

Because of the potentially very large reaction forces that occur depending on the kind of working, and that feed back into the working apparatus in the context of earth working, axial positional retention of the working apparatus on the drive configuration with a tightening torque of more than 2500 Nm is desirable in order to furnish sufficient operating reliability. Applying such a large retaining torque to the bolt arrangement of the earth milling machine known from DE 10 2012 008 252 A1 is cumbersome, and requires tools that are usually available only in workshops but not at the utilization site of the machine.

SUMMARY OF THE INVENTION

The object of the present invention is therefore to describe a technical teaching according to which the working apparatus is retainable in its axial position on the drive configuration by means of the central bolt arrangement, in simple and reliable fashion, with a high tightening torque.

According to a first aspect of the present invention this object is achieved in that the method recited initially additionally encompasses the following steps:
 bracing a bolt component, boltable relative to the drive configuration, of the bolt arrangement to prevent a rotational movement of the bolt component in a bracing bolting direction; and
 driving the drive configuration to rotate in a rotation direction codirectional with respect to the bracing bolting direction.

In terms of apparatus the aforesaid object is achieved, in accordance with a second aspect objectively correlated with the first, by an earth working machine of the kind recited initially which is embodied to execute the aforementioned method according to the present invention.

In terms of design, the embodiment of the earth working machine for executing the aforesaid method can be implemented by the fact that the earth working machine encompasses a bolting moment bracing arrangement which is connected or connectable in bolting moment-transferring fashion to a bolt component, helically movable relative to the drive configuration, of the bolt arrangement, and which comprises a bracing region that is embodied for bolting moment-bracing abutment in a bracing bolting direction against a counterpart bracing region, the drive configuration being embodied to be driven to rotate, in a rotation direction codirectional with the bracing bolting direction, while the bracing region is in abutment against the counterpart bracing region.

The basic idea of the present invention is to use the drive configuration to apply to the central bolt arrangement a sufficiently high tightening torque upon establishment of axial positional retention and/or a sufficiently high loosening torque upon release of axial positional retention. The source of torque for a tightening and/or loosening torque acting on the bolt arrangement is therefore not, as previously in the sector of earth working machines, a torque wrench or an impact driver in the form of a mechanized torque wrench that engages directly onto the bolt arrangement, but instead is the drive configuration, or a source of drive force connected in torque-transferring fashion to the drive configuration.

The bolt configuration can therefore be sufficiently dimensioned that it can be used as the only axial positional retention system of the working apparatus. Bolting moments of 2500 Nm and more can therefore be introduced into the bolt configuration. Tools introducing a high torque, which are laborious and complex to operate, are not required according to the present invention, since the drive configuration and its source of drive force are used to apply the bolting moment onto the bolt configuration.

With the working apparatus in the operational state the drive configuration preferably does not project axially beyond its retention axial end, so that the working apparatus can be brought at its retention axial end as close as possible to the edge of the remainder of the machine body. The working apparatus preferably projects axially beyond the drive configuration on at least one side, for example with its retention axial end. Particularly preferably, the working apparatus projects axially beyond the drive configuration on both sides.

Unless otherwise stated in individual cases, the present Application describes the earth working machine in a state ready for earth working as intended.

Although it is preferred in the context of the present Application that the central bolt arrangement exclusively effect axial positional retention, "effecting" of axial positional retention by the central bolt arrangement is intended already to be implemented if the central bolt arrangement contributes to axial positional retention. The additional implementation of one or several further retaining measures in addition to the central bolt arrangement is therefore not to be excluded.

Furthermore, be it noted directly at this juncture that unless otherwise indicated, the drive axis of the drive configuration is the reference magnitude for the "axial" and "radial" indications utilized in the present Application. A direction parallel to the drive axis is therefore an axial direction, and a direction proceeding orthogonally thereto is a radial direction.

The present Application discusses "drive torque" and "bolting moment." This terminology is used merely for better differentiation of torques in terms of their respectively considered location of action. The different terms are used in particular when drive torques introduced on the drive side into the drive configuration, and bolting moments occurring at the bolt configuration, are recited in close proximity to one another in the text. They are always torques. No essential difference exists between the torques that are thus differently characterized. A braced bolting moment thus can, and does, occur according to the present invention as a reaction to a drive torque introduced on the drive side.

The machine frame, constituting the basic structural unit of the earth working machine, forms a kind of basic reference system of the machine. The machine body encompasses the machine frame and further machine parts connected, including movably connected, thereto.

The drive configuration is usually coupled to a drive motor of the earth working machine, although the drive motor as a rule has a higher rotation speed than the rotation speed required at the drive configuration in the context of earth working as intended. A transmission that steps a rotation speed down, and thus steps torque up, is therefore usually operatively connected to the drive configuration. The drive configuration preferably encompasses part of the transmission housing of the transmission, and particularly preferably, when the transmission is embodied in space-saving fashion as a planetary gearset, is coupled to a ring gear of the transmission for rotation together. This transmission can advantageously be utilized in order to amplify a drive torque transferred on the drive side to the drive configuration, and thus, as a result of the torque step-up that is accomplished, to effect at the location of the bolt arrangement, with a comparatively low drive torque outputted by the drive motor or by a rotational drive, including a manual rotational drive, embodied separately therefrom, a tightening and/or loosening moment, constituting a bolting moment, which is multiplied by an amount equal to the conversion ratio. All that is necessary for this purpose is to brace the bolt component, helically movable relative to the drive configuration, of the bolt arrangement so as to prevent it from co-rotating with the driven drive configuration.

It is usually substantially simpler in terms of apparatus simply to brace a predefined large bolting moment at a bolt arrangement than to actively introduce a bolting moment of the same magnitude into the bolt arrangement by way of an operator.

Be it noted at this juncture that refinements of the earth working machine explained in the present Application are also to be understood as refinements of the method according to the present invention, and vice versa.

The counterpart bracing region against which the bolting moment bracing arrangement braces during exertion of a tightening or loosening moment can be any region that is at rest relative to the machine body. Because the earth working machine, which advantageously is self-propelled in a manner known per se, is stationary during establishment or release of axial positional retention of the working apparatus, relative to the contact substrate on which the earth working machine is currently standing, the counterpart bracing region can also be constituted by a region of the substrate.

But because the nature of the substrate carrying the earth working machine can be very different depending on where the earth working machine is being utilized, and can therefore also be unsuitable for bolting moment-bracing abutment of the bracing region of the bolting moment bracing arrangement, for example because it is too soft, the counterpart bracing region is preferably provided on the machine body.

The bolting moment bracing arrangement can be connected, for example nonreleasably, to the bolt component. It can be embodied, for example, in one piece with the bolt component. In that case it is necessary to provide the counterpart bracing region releasably on the machine body so that it is arranged on the machine body only when it is actually needed in order to brace a tightening moment or loosening moment exerted by the drive configuration. Because the working apparatus must be capable, during earth-working operation thereof as intended, of rotating relative to the machine frame without influencing positional retention of the working apparatus by the bolt arrangement, provision of the counterpart bracing region on the machine body at times other than establishment or release of axial positional retention could be detrimental to operation.

A connection is "releasable" for purposes of this Application when it is releasable without destroying components involved in the connection. A threaded connection or bolted connection or clamp or a positive bayonet connection are examples of releasable connections.

According to a preferred refinement of the present invention, the earth working machine can comprise one or several sensors that query the position of the bolting moment bracing arrangement and/or of the counterpart bracing region in a stowed position on the machine and/or the position of the bolting moment bracing arrangement and/or of the counterpart bracing region in a bracing-capable position, and the like. A machine controller of the earth working machine is preferably connected to the at least one sensor and is configured so as to permit earth-working operation of the machine as intended only when the detection signal or signals transferred from the at least one sensor indicate that a collision between the bolting moment bracing arrangement and the counterpart bracing region is precluded.

Conversely, if the at least one sensor signal indicates a collision risk, the maximum power outputtable by the drive motor can be limited to a value reduced with respect to the rated output during earth-working operation, or the drive motor can be shut off and the introduction of torque into the drive apparatus can be limited to a rotational drive, including a mechanical rotational drive, embodied separately from the drive motor.

The counterpart bracing region is preferably implemented on a counterpart bracing component. Even if the bolting moment bracing arrangement is not connected permanently to the bolt component but instead is connectable to it as necessary, a counterpart bracing component of this kind can be releasably connected to the machine frame, or to the remainder of the machine body, for repair, maintenance, and replacement purposes. As a result of the releasable connectability of the bolting moment bracing arrangement to the bolt component, however, in order to decrease installation complexity the counterpart bracing component can also be provided on the machine body, and/or connected to it, during operating phases of the earth working machine as intended.

In many cases an encasing component is arranged on the earth working machine for industrial safety reasons, at a distance oppositely from the retention axial end in a direction away from the drive axial end, so that the working apparatus is not accessible in an axial direction during phases of earth-working operation as intended. Because the bolt arrangement is preferably located closer to the retention axial end than to the drive axial end of the working apparatus, the counterpart bracing region can easily and advantageously be provided on an encasing component of this kind, e.g. in the form of the counterpart bracing component, for example (in order to furnish sufficient strength) as a sheet steel component that is connected to the encasing component. The counterpart bracing component can preferably comprise a passthrough opening through which at least the bolt component of the bolt arrangement is accessible.

In the preferred case of a milling drum or milling rotor constituting the working apparatus, the latter is usually located, in a manner known per se, in a milling drum housing that shields the working apparatus not only at the ends but also in and oppositely to the longitudinal machine direction of the earth working machine. The known encasing component can be part of such a milling drum housing. It can be movable relative to the machine frame and to the remainder of the machine body, for example connected removably or pivotably movably to the machine frame, so as to enable rapid and simple changing of the working apparatus after release of the bolt arrangement. As a rule, the working apparatus and the machine body are moved away from or toward one another axially in order to change the working apparatus.

According to an advantageous refinement of the present invention, the encasing component is connected pivotably movably to the machine frame, a non-locating bearing that mounts the working apparatus for rotation around the drive axis being connected to the encasing component for movement together. It is thus possible, with the pivoting movement of the encasing component from a closed position in which the encasing component shields the working apparatus and/or the drive configuration from external access, into an access position in which the working apparatus and/or the drive configuration are axially accessible, for the non-locating bearing to be pulled off a corresponding bearing configuration of the working apparatus or of the drive configuration.

The non-locating bearing is referred to as a "non-locating" bearing because it mounts a bearing configuration of the working apparatus or of the drive configuration rotatably around the drive rotation axis but displaceably along the drive rotation axis. A change caused, for example thermally, in the length of the bearing components (non-locating bearing and bearing configuration) involved in the non-locating bearing point, and/or of the components that are mounted, is thus possible without resulting in excessively large mechanical stresses in the components involved. With the earth working machine in the operational state, the non-locating bearing as a rule is located axially closer to the retention axial end of the working apparatus than to its drive axial end. A locating bearing that is provided, with the exception of a locating bearing component rotatable around the drive axis, on the machine frame immovably relative to the machine frame and is provided for rotational mounting of the working apparatus and, as a rule, also the drive configuration around the drive axis, is usually located closer to the drive axial end than to the retention axial end.

It is known from DE 40 37 448 A1 to move the non-locating bearing, together with a planar encasing component that is part of a milling drum housing, translationally along the drive axis away from or toward the working apparatus in the form of a milling drum. It is necessary for that purpose, however, to remove the encasing component completely from the machine frame, which entails a considerable installation outlay.

Provision is made more advantageously, in accordance with a refinement of the present invention, to provide the encasing component pivotably movably on the machine frame. The non-locating bearing connected to the encasing component for pivoting movement together can thus, by a pivoting movement of the encasing component, be pulled off the bearing configuration of the working apparatus or the drive configuration and/or slid onto the bearing configuration, depending on the pivoting direction. This is because the encasing component articulated pivotably on the machine frame can remain connected in lossproof fashion to the machine frame and can thereby, with repeatable accuracy, guide a pulling-off movement of the non-locating bearing from the bearing configuration characterized above, or a sliding-on movement onto such a bearing configuration.

Regardless of the above-described advantageous refinement of the present invention, the pivoting movement of the non-locating bearing of the working apparatus together with the encasing component provided pivotably movably on the machine frame imparts particular value to an earth working machine because of the resulting considerably simplified capability for installing and removing the working apparatus onto and from the machine body. The present Application therefore also relates to an earth working machine, for example a road milling machine, a recycler, a stabilizer, or a surface miner and the like, encompassing a machine body having a machine frame and a drive configuration rotationally drivable around a drive axis, defining an axial direction, relative to the machine frame, the earth working machine encompassing a working apparatus for earth working to which the drive configuration is releasably connected in drive torque-transferring fashion for rotation together, the working apparatus extending axially between a drive axial end and a retention axial end located oppositely from the drive axial end and radially externally surrounding the drive configuration of the earth working machine, an encasing component that is connected pivotably movably to the machine frame and carries a non-locating bearing, which mounts the working apparatus for rotation around the drive axis and is connected to the encasing component for pivoting movement together, being arranged oppositely from the retention axial end, at a distance from the retention axial end in a direction away from the drive axial end, with the earth working machine in the operational state.

The non-locating bearing can mount the working apparatus directly, or indirectly via the drive configuration, for rotation around the drive axis.

According to a preferred refinement in order to achieve the advantages recited above, the working apparatus of this earth working machine can be retained on the drive configuration, against axial displacement relative to the drive configuration, by way of a central bolt arrangement, accessible in the region of its retention axial end, having a bolt axis collinear with the drive axis.

The advantageous refinements described below relate to all the earth working machines described in the present Application.

The non-locating bearing preferably comprises a recess into which a bearing stem, constituting the bearing configuration of the drive configuration or of the working apparatus, projects with the earth working machine in the operational state. The bearing stem is preferably provided in a region located closer to the retention axial end of the working apparatus than to the drive axial end, and extends in an axial direction away from the drive axial end. The bearing stem preferably protrudes axially out of a protrusion structure carrying it. When the bearing stem is connected to the working apparatus to rotate together, the protrusion structure can be, for example, a flange configuration by way of which a component comprising the bearing stem is connected, preferably releasably connected, to the working apparatus. Alternatively, when the bearing stem is connected to move together with the drive configuration, the protrusion structure can be an end plate of the drive configuration from which the bearing stem passes centeringly, along the drive axis, through a connecting flange of the working apparatus.

Because the non-locating bearing on the one hand mounts the bearing stem axially displaceably for rotation around the drive axis, but on the other hand is intended to be slid onto the bearing stem or pulled off it by way of a pivoting movement that deviates from the drive rotation axis because it follows a curved trajectory, the design-related relative movability of the bearing stem and non-locating bearing, and the actual relative movement of the bearing stem and non-locating bearing while being slid on and pulled off, do not match. The result, in the context of sliding the non-locating bearing onto, and pulling it off, the bearing, is a risk of an undesired collision between the bearing stem and the non-locating bearing.

In order to achieve a collision-free, or at least low-collision, pivoting movement of the non-locating bearing together with the encasing component, the bearing stem is preferably embodied to taper axially in a direction away from the drive axial end. Additionally or alternatively, the recess of the non-locating bearing is embodied to widen axially in a direction toward the working apparatus.

For maximally stable mounting of the bearing stem on the non-locating bearing, the bearing stem comprises preferably at least two, particularly preferably exactly two, cylindrical bearing surfaces at an axial distance from one another, which are surrounded with zero clearance by hollow-cylindrical counterpart bearing surfaces of the non-locating bearing when the earth working machine is in the operational state. In order to simplify sliding or pivoting of the non-locating bearing onto the bearing stem by way of a pivoting movement of the non-locating bearing, the cylindrical bearing surface located axially farther from the protrusion structure preferably has a smaller diameter than the cylindrical bearing surface located axially closer to the protrusion structure. What has been stated with regard to the cylindrical bearing surfaces is correspondingly true, mutatis mutandis, for the hollow-cylindrical counterpart bearing surfaces of the non-locating bearing which surround and are in contact with the cylindrical bearing surfaces of the bearing stem with the earth working machine in the operational state.

A particularly advantageous embodiment of the bearing stem which enables a pull-off and slide-on movement, accompanying the pivoting movement together of the non-locating bearing and encasing component, of the non-locating bearing respectively from and onto the bearing stem in particularly low-collision fashion will be explained below with reference to notional cones that envelopingly surround portions of the bearing stem. According to a preferred embodiment, the axially tapering conformation of the bearing stem is such that the opening angle of two notional enveloping cones that respectively abut tangentially against two osculating circles, located at an axial distance from one another, on the surface of the bearing stem and surround an axial portion of the bearing stem located between the osculating circles, is smaller for cones of osculating circle pairs located closer to the protrusion structure. The osculating circles abut respectively against the radial outer surface of the bearing stem.

In design terms, as a concrete example of an advantageous refinement of the present invention, the bearing stem can comprise a smaller-diameter first cylindrical bearing surface farther from the protrusion structure and a larger-diameter second cylindrical bearing surface closer to the protrusion structure.

Assume a first notional enveloping cone whose first osculating circle, located farther from the protrusion structure, is placed at the free axial longitudinal end located remotely from the protrusion structure, and whose second osculating circle, located closer to the protrusion structure, is located axially between the first osculating circle and the axial longitudinal end, located closer to the free bearing stem longitudinal end, of the first cylindrical bearing surface. The latter longitudinal end is explicitly part of the axial region delimiting it, and can therefore be a site of the second osculating circle.

Assume further a second notional enveloping cone whose first osculating circle, located farther from the protrusion structure, is placed at the axial longitudinal end, located closer to the free bearing stem longitudinal end, of the first cylindrical bearing surface. At this characteristic first osculating circle, constituting the beginning of the second notional cone, the second notional cone can abut tangentially against the outer surface of the bearing stem but does not need to do so. The second osculating circle of the second notional cone is located axially between its first osculating circle and the axial longitudinal end located closer to the free bearing stem longitudinal end, including that longitudinal end, of the second cylindrical bearing surface. With the exception of the first osculating circle of the second notional cone, the two notional cones abut tangentially against all the osculating circles at the outer surface of the bearing stem.

Under the conditions recited above, the bearing stem is embodied for low-collision sliding-on and pulling-off movement of the non-locating bearing if the first notional cone has a larger opening angle than the second notional cone.

The following exceptions are to be noted: If the free longitudinal end of the bearing stem has a bevel, the bevel edge located axially closer to the protrusion structure is to be employed as the first osculating circle of the first notional cone. If the bevel edge located axially closer to the protrusion structure is itself the axial longitudinal end, located closer to the free bearing stem longitudinal end, of the first cylindrical bearing surface, the cone of the bevel then constitutes the first notional cone. The bevel angle is then its opening angle.

The opening angle of the first notional cone is preferably equal to at least 1.5 times the opening angle of the second notional cone, particularly preferably at least 2.5 times. Also preferably, the opening angle of the second notional cone is equal to 5° to 15°, particularly preferably 8° to 13°.

A comparatively larger opening angle of the first notional cone allows the free bearing stem longitudinal end to be captured even if the location of the longitudinal axis of the bearing stem, with the non-locating bearing pulled off, differs greatly from the ideal location of the drive axis because of the dead weight of the working apparatus and/or of the drive configuration.

The smaller opening angle of the second notional cone compared with the opening angle of the first notional cone makes it possible, after capture of the free bearing stem longitudinal end, to slide the non-locating bearing onto the bearing stem in the course of the pivoting movement of the non-locating bearing relative to the bearing stem.

In principle, the drive axis can be oriented arbitrarily on the machine body; preferably it is oriented parallel to the contact substrate so that a homogeneous working engagement of the working apparatus with the ground can be brought about over the axial extent of the working apparatus. The drive axis is preferably oriented in a transverse machine direction of the working machine, so that the working apparatus can be advanced relative to the ground orthogonally to the drive axis by a travel drive of the earth working machine.

Bolting moment bracing that is both simple and effective can be achieved by way of a positive engagement between the bracing region and counterpart bracing region. A frictional engagement is theoretically also conceivable, but positively engaging bracing is preferred because of the aforementioned large tightening and loosening moments. Provision can be made concretely, for this purpose, that one region from among the bracing region and counterpart bracing region comprises at least one projection, and that the respective other region from among the bracing region and counterpart bracing region comprises at least one recess into which the projection projects.

Because the counterpart bracing region advantageously can be arranged, because of the available installation space, in such a way that it radially externally surrounds the bolt component or, when there is an axial offset therefrom, is provided at least radially outside the radial extent, if applicable considered to be axially prolonged, of the bolt component, preferably the projection is embodied on the bracing region and the recess on the counterpart bracing region. Because permanent arrangement of both the bracing region and the counterpart bracing region on the earth working machine as a rule is disadvantageous in terms of operation of the earth working machine for the reasons recited above, one of the two regions is, as already set forth in conjunction with the counterpart bracing region, removable from the earth working machine after establishment or release of axial positional retention. In order to facilitate the placement and/or removal of the bracing region and counterpart bracing region relative to one another on the earth working machine, preferably the recess is embodied to be larger than the projection, so that an exact relative rotational position of the drive configuration relative to the machine frame is unimportant in terms of the arrangement of one or both regions on the earth working machine. Preferably the recess is a radial recess, with reference to the extended imaginary drive axis, which extends around the drive axis in a circumferential direction over a larger angular region than the projection interacting with it.

The bolt component can be a nut or a bolt. The bolting moment bracing arrangement can then, as already indicated above, be embodied in one piece with the bolt component, for example if at least one projection projects radially and/or axially from the bolt component, e.g. from the nut or from the bolt head, as is known, for example, from wing nuts and thumbscrews. That projection is then conveyable into abutting engagement with a contour delimiting the recess of the counterpart bracing region.

The installation and deinstallation of the counterpart bracing region which are then necessary can, however, entail an undesired installation complexity. It is therefore preferred that the bolting moment bracing arrangement be embodied as a tool arrangement, separate from the machine body and from the bolt arrangement, having an engagement region that is embodied for releasable torque-transferring engagement with a counterpart engagement region of the bolt component.

The aforementioned method can correspondingly be refined in that the bracing step encompasses the following sub-steps:
  connecting an engagement region of a bolting moment bracing arrangement, embodied separately from the machine body, to a counterpart engagement region of the bolt component for torque transfer between the bolting moment bracing arrangement and the bolt component; and
  arranging a bracing region of the bolting moment bracing arrangement for bolting moment-bracing abutment against a counterpart bracing region, preferably against a counterpart bracing region on the machine body.

Although the counterpart engagement region of the bolt component can have any conformation, it is advantageous to use as a counterpart engagement region a tool engagement configuration usually present in any case on bolt components, for example a polyhedral configuration, such as e.g. a known hex head or hex socket configuration, and the like. The advantage of the separate embodiment of the bolting moment bracing arrangement is that it can be embodied in that case with a comparatively small physical volume, and can be carried along in stowed fashion on the earth working machine when not in use. For example, the bolting moment bracing arrangement can be slid with its engagement region axially onto at least a portion of the bolt component and pulled off it again, for example in the manner of a fitover tool as known from socket wrenches. The engagement region is therefore preferably embodied as a fitover engagement region on the bolting moment bracing arrangement, which region, particularly preferably when engagement is established, continuously surrounds the counterpart engagement region in a circumferential direction around the drive axis.

In accordance with an advantageous refinement of the invention provision can then be made that, when viewing the bolting moment bracing arrangement with engagement established between the engagement region and counterpart engagement region, the at least one projection projects radially from an engagement portion, comprising the engagement region, of the bolting moment bracing arrangement.

A test apparatus, which is embodied to check the magnitude of a torque acting between the bracing region and the engagement region, can be provided in the torque transfer path between the bracing region and the engagement region in order to monitor the bolting moment exerted on the bolt arrangement. It is sufficient in this context if the test apparatus is embodied to check that a predetermined or predeterminable rated bolting moment, or a predetermined or predeterminable rated bracing moment, has been reached. The test apparatus can therefore be a torque-transferring connection, acting in load-dependent fashion, between the bracing region and the engagement region, i.e. for example between the at least one projection and the engagement portion. The test apparatus can thus be a coupling that acts in load-dependent fashion, for example a slip coupling, which transfers a torque up to the predetermined or predeterminable limit value and, upon exertion of a torque higher than the limit torque, severs the torque-transferring connection between the bracing region and the engagement region, for example by slipping.

Additionally or alternatively, the test apparatus can be embodied to output a signal, preferably a "click" already known from torque wrenches, when the predetermined or predeterminable limit bolting moment or limit bracing moment is reached. When the limit moment of the test apparatus corresponds to the desired rated bolting moment or correlates in a desired manner with it, the bolt arrangement can then be effectively and reliably tightened on the bolting moment bracing arrangement, with simple means, with a desired rated tightening moment. Loosening, conversely, as a rule does not require any detection of a bolting moment, since all that is important then is to release axial positional retention regardless of the magnitude of the bolting moment required for that purpose.

In order to brace the aforementioned large tightening or loosening moment, it can be advantageous to provide more than one projection on the bolting moment bracing arrangement so that at least two projections can project from the engagement portion. To allow the projections to be brought into stable positive abutting engagement with a corresponding abutment contour of the counterpart bracing region, it is advantageous on the other hand not to make the recess in the counterpart bracing region too large, and thereby not to excessively weaken the counterpart bracing region and the component embodied in it. The at least two projections are therefore preferably located diametrically opposite one another with respect to the drive axis when engagement is established between the engagement region and counterpart engagement region. For the reasons recited, particularly preferably exactly two projections are provided on the bolting moment bracing arrangement. These should preferably project at least radially in order to be able to constitute a load arm sufficient for bracing large bolting moments. If necessary, however, they can additionally also project axially, for example in a direction away from the drive axial end when engagement is established.

For introduction of a drive torque into the drive configuration, provision can be made that the drive configuration is connected to a drive torque-transferring arrangement. The drive torque-transferring arrangement is provided for transferring drive torque to the drive configuration. The drive torque-transferring arrangement is coupled for that purpose to a drive motor of the earth working machine and/or comprises a coupling configuration for temporary coupling to the rotational drive, already mentioned above, embodied separately from the drive motor of the earth working machine.

In principle, the drive motor of the earth working machine, which motor is present in any case and drives the working apparatus to operate as intended, can be used as a source of drive force for exerting the tightening or loosening moment. This is possible in particular when, as is possible e.g. with smaller earth working machines, a drive motor whose output can be regulated within wide limits is present, for example an electric motor or a hydraulic motor.

Regardless of the conformation of the drive motor of the earth working machine, however, it is always possible to use a rotational drive, including a manual one, which is embodied separately from the drive motor and can be temporarily coupled to the aforesaid coupling configuration for transfer of a torque. The coupling configuration can be implemented on a component that can be part of the drive torque-transferring arrangement between the drive motor and the drive configuration, or can be part of a further drive torque-transferring arrangement that serves only to transfer drive torque from the separate rotational drive.

In addition or alternatively to the above-described bracing arrangement-side test apparatus, a drive-side test apparatus can be provided on the drive side of the drive configuration in order to ascertain a bolting moment, in particular a tightening moment, that is actually being exerted. A mechanical drive-side test apparatus corresponding to the above-described bracing arrangement-side test apparatus, including in terms of the physical principles of action utilized, can be arranged or at least arrangeable in the drive torque-transferring arrangement. The description above of the bracing arrangement-side test apparatus correspondingly applies in that regard to the mechanical drive-side test apparatus. A mechanical drive-side test apparatus permanently arranged in the drive torque-transferring arrangement between the drive motor and drive configuration can preferably be switched on and off for undisrupted earth working, for example by raising the limit moment value of the test apparatus above the drive torque values that are transferred in the drive torque-transferring arrangement in the context of earth working as intended.

Additionally or alternatively, a drive-side test apparatus can detect at least one variable characterizing energy delivery to the drive motor or, in particular, to the separate rotational drive, during drive torque introduction into the drive configuration with the bolt arrangement braced, and infer therefrom the drive torque introduced during energy delivery. In the context of utilization of a hydraulic rotational drive, this is expressly intended to include detection at least of the pressure of the hydraulic fluid delivered to the rotational drive during drive torque introduction. The drive-side test apparatus can therefore be provided in a hydraulic line of the earth working machine which is embodied as a supply line for connection of a hydraulic rotational drive. Based on the known torque transfer relationships between the test apparatus detection site and the bolt arrangement site, it is again possible to infer the bolting moment, in particular the tightening moment, from the drive torque.

The drive-side test apparatus can be connected to a machine controller of the earth working machine which, for example on the basis of characteristics diagrams and/or value tables stored in a memory apparatus, ascertains from a detected value of the test apparatus the bolting moment associated therewith, and outputs it to the vehicle driver via an acoustic and/or optical signal. The machine controller can also indicate, on the basis of the detected value of the test apparatus, that a rated bolting moment has been reached.

In a manner known per se, the machine controller of the earth working machine can utilize electronic circuits and can comprise microprocessors and/or a stored-program control system as well as a data memory coupled thereto in data-transferring fashion.

The drive torque-transferring arrangement is preferably connected, for the transfer of torque, to that longitudinal end of the drive configuration which is located closer to the drive axial end of the operational working apparatus than to the retention axial end. This makes possible advantageous bracing of the bolting moment on one side of the earth working machine, and introduction of a drive torque on the other side, located oppositely with respect to the drive axis, of the earth working machine.

For the reasons recited above, the aforementioned transmission that reduces drive rotation speed and increases drive torque is preferably located in the torque transfer path between the coupling configuration and the drive configuration.

In order to provide good dimensional stability simultaneously with minimum weight, the drive configuration is preferably at least in portions a hollow body, in particular a body embodied in tubular fashion at least over an axial portion. It can taper toward its longitudinal end that is located closest to the retention axial end when the earth working machine is in the operational state. In the region of that longitudinal end, preferably at the longitudinal end itself, the drive configuration can comprise a drive torque-transferring coupling arrangement for drive torque-transferring coupling to a counterpart coupling arrangement of the working apparatus. In order to transfer the maximum possible drive torques, the coupling arrangement is preferably conveyable into, and releasable from, positive engagement with the counterpart coupling arrangement.

Not infrequently in the context of earth working machines, the aforesaid transmission increases a drive torque inputted into it on the input side by a factor of 10 or more on the output side. The separate rotational drive, which is preferably an electrical or pneumatic drive, can therefore also be a manually operated torque wrench, since with the interposed torque-step-up transmission it is easily possible to achieve, with input torques of 250 Nm or more, 2500 Nm or more at the engagement point between the drive configuration and bolt arrangement.

With respect to the statements made above regarding the apparatus, a preferred refinement of the method recited above correspondingly provides that it encompasses, before the drive configuration is driven, releasable coupling of the drive configuration to a rotational drive embodied separately from the drive motor of the earth working machine.

In order not only to achieve axial positional retention of the working apparatus relative to the drive configuration using the drive configuration and the bolt arrangement, but also to be able to ensure therewith that a central apparatus axis of the working apparatus is collinear, within the context of the requisite accuracy, with the drive axis of the drive configuration in the completely installed state, provision is preferably further made that the drive configuration comprises, at its longitudinal end closer to the retention axial end, a centering configuration that is embodied for positive centering engagement with a counterpart centering configuration connected rigidly to the working apparatus. As a rule, the centering configuration is not the only centering system for the working apparatus with respect to the drive configuration. A second centering system is usually provided at an axial distance from the centering configuration.

Although in principle any type of centering configuration can be used, a centering stem of the drive configuration, projecting axially from the drive configuration in a direction away from the drive axial end, is preferred, since with this centering stem a threaded bore of sufficient axial length for bolting engagement with the bolt arrangement can be furnished.

Embodiments of the earth working machine according to the present invention can be embodied in such a way that the centering stem is, or comprises, the aforementioned bearing stem interacting with the non-locating bearing for rotational mounting of the working apparatus.

The counterpart centering configuration connected rigidly to the working apparatus is, accordingly, preferably a centering recess into which the centering stem projects, optionally in pass-through fashion, with the working apparatus in the completely installed state, and which preferably contacts the centering stem circumferentially. The centering stem preferably tapers toward its protruding longitudinal end; also preferably, the centering recess tapers in the same direction, so that when the centering recess is slid axially onto the centering stem, self-centering of the counterpart centering configuration on the centering stem results from the axial relative movement.

According to a particularly preferred embodiment of the present invention, the centering stem tapers in stepped form toward its protruding longitudinal end, and comprises a smaller-diameter pre-centering stem portion located axially farther from the drive configuration, as well as a larger-diameter main centering stem portion located axially closer to the drive configuration. The pre-centering stem portion can serve to "load" the centering stem into the centering recess, and can thus serve for pre-centering alignment of the working apparatus on the drive configuration in the context of installation thereof, for example so as to arrange the working apparatus in a preparation position explained in more detail below, and then to allow it to be displaced, based on the pre-alignment already accomplished, axially from the preparation position into the operational operating position under facilitated conditions.

The possible radial deviation of the rotation axis of the working apparatus from the drive rotation axis thus decreases as the working apparatus axially approaches its operating position. This centering of the working apparatus with respect to the drive rotation axis is brought about by the physical engagement of the centering stem, embodied as described above, into the centering recess, and by the axial approach of the working apparatus toward its operating position. The displacement force needed in order to bring the working apparatus closer to its operating position on the one hand depends on the radial distance to be covered between the rotation axis of the working apparatus and the drive rotation axis, and on the other hand depends on the physical conformation of the surfaces that interact with one another (outer surface of the centering stem and inner surface of the centering recess).

In the operating position, the working apparatus is centered relative to the drive configuration, preferably exclusively, by the main centering stem portion, which is centeringly surrounded by a main centering recess portion of the centering recess. With the working apparatus in the operating position, the pre-centering stem portion is likewise surrounded by a pre-centering recess portion of the centering recess. For easier placement of the centering stem in the centering recess, a larger radial clearance is present between the pre-centering stem portion and the pre-centering recess portion than between the main centering stem portion and the main centering recess portion. This includes a radially zero-clearance abutment of the main centering stem portion and main centering recess portion.

For easier displacement of the working apparatus into its operating position, according to a preferred refinement of the present invention the centering recess can be embodied with an opening angle that decreases along its taper. The opening angle can decrease in steps.

A preferred embodiment of the centering recess will again be described on the basis of cones that abut in contacting, but not penetrating, fashion respectively at two contact circles located with an axial spacing from one another. Axially outside its contact circles, a cone can penetrate through the inner surface of the centering recess. To differentiate these cones from the notional cones used above to describe a preferred external conformation of the bearing stem, the cones used to describe the internal conformation of the centering recess will be referred to as "virtual" cones.

Assume a first virtual cone that abuts against the edges, located axially closest to the drive axial end, respectively of the main centering recess portion and of the pre-centering recess portion.

Assume further a second virtual cone that abuts on the one hand against that edge of the pre-centering recess portion which is located axially closest to the drive axial end, and on the other hand against an edge, located closest to the drive axial end, of a radial shoulder of the centering recess axially following the pre-centering recess portion in a centering stem penetration direction, or of a recess of which the centering recess is a part.

The working apparatus can be brought axially closer to the operating position, accompanied by introduction of the centering stem into the centering recess, with particularly low displacement forces when the first virtual cone has a larger opening angle than the second virtual cone.

The opening angle of the first virtual cone is preferably between 20° and 40°, particularly preferably between 25° and 35°. Also preferably, the opening angle of the first virtual cone is between 3 and 6 times, particularly preferably 4 to 5 times, larger than the opening angle of the second virtual cone.

The centering recess is preferably embodied on the same component as the above-described cylindrical bearing surfaces that interact with the non-locating bearing. A bearing stem connected directly to the working apparatus, such as the one already described above, can serve as such a component. In order to ensure that a bearing stem has sufficient load capacity in consideration of the large working forces occurring during earth working and the reaction forces resulting therefrom, the opening angle of the first virtual cone is preferably larger than the opening angle of the above-described first notional cone. Alternatively, or preferably additionally, the opening angle of the second virtual cone can be smaller than the opening angle of the above-described second notional cone. It is thereby possible to furnish a bearing stem, having an axially continuous recess, which has over its axial extent a material thickness that is always radially sufficient but not excessive.

A preferred displacement of the working apparatus into the operating position by means of a pivoting movement of the encasing component is described below. With this type of displacement of the working apparatus into the operating position, both sliding of the non-locating bearing onto the bearing stem and sliding of the centering recess onto the centering stem occur with a close correlation in time, and act both on the non-locating bearing and on the working apparatus solely by the pivoting of the encasing component constituting the only force transfer operation from outside. There is therefore a close technical correlation between the external conformation of the bearing stem and the internal conformation of the centering recess, which constitute the conformations involved in a unified displacement operation.

Additionally or alternatively, simplified loading of the centering stem into the centering recess, and subsequent displacement of the working apparatus into the operating position, can also be achieved by the fact that the pre-centering recess portion is embodied to be longer than the main centering recess portion. Also preferably, the magnitude by which the main centering recess portion is axially longer than the pre-centering recess portion can be greater than the magnitude by which the main centering recess portion is located radially farther outward than the pre-centering recess portion. Also preferably, the axial spacing between the main centering recess portion and the pre-centering recess portion can be smaller than their radial spacing from one another. This makes possible the advantageous use of axially shorter centering stems. For clarification, be it noted that any bevels or fillets or the like that may be present at one axial end of both the main centering recess portion and the pre-centering recess portion are not part of the relevant centering recess portion.

It is thus also possible, in the context of installation on the drive configuration, for example upon placement of a new or repaired working apparatus on the machine body, to preposition the working apparatus, having the counterpart centering configuration rigidly connected to it, approximately axially on the drive configuration, and to displace it by means of the central bolt arrangement into its final axial position and retain it there. The axial displacement of the working apparatus can be accomplished by direct engagement of a torque tool on the bolt component, for example using a torque wrench, a wrench, or an impact driver and the like, so that the bolt arrangement, but not a drive motor or rotational drive permanently or temporarily coupled to the drive configuration, is used for axial positioning of the working apparatus relative to the drive configuration. The advantage is that upon a tool engagement on the bolt component, the latter can be brought helically closer to the drive configuration without resulting in a rotational movement of the drive formation and therefore also of the working apparatus. A substantially lower torque than the torque recited above for establishing and/or releasing axial positional retention is sufficient for this. With a corresponding embodiment of the bolting moment bracing configuration and counterpart bracing region, the working apparatus can be displaced axially by means of the bolt arrangement, using the bolting moment bracing configuration and the counterpart bracing region, from a preparation position axially remote from the operating position toward the operating position or, even more advantageously, into the operating position. The possible source of drive force recited above can once again be used for this. The bolting moment bracing configuration is, for this purpose, preferably arrangeable on the bolt component of the bolt arrangement latchably or otherwise with elevated axial pull-off resistance, so that the bolting moment bracing configuration remains in engagement with the bolt component during the process of bolting it on.

When the working apparatus has reached its intended axial position, the aforementioned method and the aforementioned bolting moment bracing arrangement can be used to exert the desired high tightening torque on the bolt arrangement by driving the drive configuration.

For axial sliding of the drive apparatus onto the drive configuration, it is sufficient if the bolt component encompasses a portion that comes directly into abutment against a component connected rigidly to the working apparatus or against an auxiliary component that transfers a force from the bolt component to the working apparatus. It is sufficient for this purpose if the portion of the bolt component projects radially beyond a central opening, penetrated by the bolt arrangement, of the component rigidly connected to the working apparatus or of the auxiliary component. The auxiliary component can be a sleeve, if applicable a conical sleeve.

In principle, as already indicated above, the bolt component can be a nut and the drive configuration can encompass a threaded shank, standing out from the drive configuration in a direction away from the drive axial end toward the retention axial end, onto which the nut is screwed. This is not preferred, however, since upon installation of the working apparatus onto the drive configuration and deinstallation therefrom, the working apparatus (which as a rule is heavy) can come into contact with the threaded shank and deform it. Provision is therefore made that the bolt component comprises a threaded shank and a tool engagement portion, radially wider compared with the threaded shank, having a tool engagement configuration, the shank being boltable into the drive configuration, in particular into the centering configuration.

The bolt component is preferably a bolt having a threaded shank and a head embodied in one piece thereon. The bolt component is then the bolt arrangement. The tool engagement configuration is identical to the one recited above, which can be brought into engagement with the engagement portion of the bolting moment bracing arrangement embodied separately from the bolt arrangement or bolt component.

Alternatively, the working apparatus can also be displaced from the preparation position toward the operating position without using the bolt component. This is because when the non-locating bearing for rotational mounting of the working apparatus is arranged on the machine frame pivotably movably together with an encasing component, as described above, the working apparatus can be displaced, by a pivoting movement of the encasing component from the access position into the closed position, from the preparation position toward the operating position, particularly preferably into the operating position.

In order to assist the displacement of the working apparatus from the preparation position toward the operating position, preferably into the operating position, the encasing component can be drivable by a pivot actuator for the pivoting movement at least during a movement segment from the access position into the closed position. The encasing component can also be drivable by the pivot actuator, bidirectionally in both opposite pivot directions, for the pivoting movement between the access position and closed position.

For example, the encasing component can be moved manually from the access position toward the closed position until a portion of the non-locating bearing comes into abutting engagement with a portion of the bearing stem. Once this abutting engagement is established, the encasing component can be moved into the closed position by impingement of force by a pivot actuator, for example by one or several piston/cylinder arrangements, the working apparatus simultaneously being displaced into the operating position and the non-locating bearing in that context being slid onto the bearing stem into a position ready for rotational mounting.

The working apparatus can also be moved in simple fashion out of its operational axial position after axial positioning retention is released. Particular attention is to be paid in this context to an initial movement introducing the axial pulling-off movement, since the working apparatus, not only heavily mechanically loaded but also greatly impacted by dirt, often gets stuck in its axial operating position on the drive configuration specifically during earth-removing operation, and the elevated adhesion thereby brought about must first be overcome. These holding forces, which are in fact undesired, can be overcome in mechanical fashion after axial positioning retention release by the fact that a centering component, comprising the counterpart centering configuration or connected rigidly to the counterpart centering configuration, comprises a central passage through which the drive configuration, in particular the centering configuration, is accessible when the working apparatus is arranged on the drive configuration. The centering component furthermore comprises, with an axial spacing in a direction away from the drive configuration, a fastening and/or advancing configuration in particular in the form of a thread, in which a release component is fastenable after the bolt component is removed from the earth working machine (once again with the working apparatus arranged on the drive configuration), and/or with which the release component is advanceable toward the drive configuration, in particular toward the centering configuration, with axial force bracing against the centering component.

According to a preferred refinement of the present invention, the centering component can be the aforementioned bearing stem of the working apparatus which interacts with the non-locating bearing for rotational mounting of the working apparatus, or can comprise that bearing stem.

In accordance with an approach that is preferred in design terms because of its stability, the release component can comprise: a cooperating configuration for engagement with the fastening and/or advancing configuration; an abutment portion for exerting axial force on the drive configuration, in particular on the centering configuration; and a torque-transferring configuration for torque-transferring engagement with a torque tool. The torque tool can be a manual or automated torque wrench, or can be the bolting moment bracing arrangement. The engagement region of the bolting moment bracing arrangement can be brought into torque-transferring engagement with the torque-transferring configuration. The abutment portion of the release component can then be brought into abutment against the drive configuration, with torque bracing of the release component by way of the bolting moment bracing arrangement on the one side of the earth working machine, and by introducing a torque on the axially opposite other side (drive side) of the earth working machine utilizing the engagement between the cooperating configuration and the fastening and/or advancing configuration. As torque introduction continues, the working apparatus can then be pushed axially off the drive configuration by way of the release component that abuts against the drive configuration and is in positive engagement with the working apparatus. This is because the positive engagement, preferably e.g. a bolting engagement, enables an axial relative movement between the working apparatus and release component. This aspect of the use of the bolting moment bracing arrangement on an earth working machine, together with the release component on a working apparatus that radially externally surrounds the drive configuration and is no longer retained on the drive configuration in terms of its axial relative position, is not only a preferred refinement of the above inventive idea of using the bolting moment bracing arrangement together with the bolt arrangement, but also constitutes a further inventive idea independent of the one above. This is because in principle the release component also constitutes a, preferably likewise central, bolt arrangement within the meaning of the present invention, with the difference that it is embodied not to retain the working apparatus on the drive configuration against axial displacement but for exactly the opposite purpose: for axial displacement of the working apparatus relative to the drive configuration away from the latter.

Preferably the cooperating configuration is an external thread and the fastening or advancing configuration is an internal thread. Also preferably, the central passage of the centering component has a larger unobstructed width than a central recess of the drive configuration or centering configuration in which a threaded portion of the bolt arrangement is received when axial positional retention is established. In this case a shank portion which is stable, because it is sufficiently thick, and at whose longitudinal end located remotely from the cooperating configuration the abutment portion is located, can protrude from the cooperating configuration. This can be brought, by advancing the releasing component, preferably by helical advance, into abutment with the material surrounding the central recess of the drive configuration, in particular of the centering configuration. The torque-transferring configuration can be embodied on that side of the cooperating configuration which faces away from the abutment portion.

The working apparatus is preferably a milling drum or milling rotor encompassing a milling drum tube which is radially internally hollow at least in portions and on whose radially outward-facing side material-removing tools, such as milling bits and, for simplified replacement thereof, bit holders and/or quick-change bit holders, can be arranged in a manner known per se. The working apparatus can be capable of being lowered toward the contact substrate and raised away from it, relative to the machine body or together with the machine frame carrying the machine body.

In earth working machines having milling drums, the one side of the earth working machine that is located closer to the drive axial end of the milling drum mounted operationally on the machine body is usually the drive side, and the opposite side of the earth working machine which is located closer to the retention axial end of the milling drum is the so-called "idle" side. Particularly advantageously, the present invention makes it possible to establish or release axial positional retention of the working apparatus on the drive configuration by bolting moment bracing of the central bolt arrangement on the idle side, and by introducing drive torque into the drive configuration on the drive side, of the earth working machine.

The present invention likewise makes it possible, additionally or alternatively, to mechanically push the working apparatus in an axial direction away from the drive configuration utilizing the aforementioned release component and the bolting moment bracing arrangement. Bolting moment bracing of the release component on the idle side is effected by the bolting moment bracing arrangement, and an introduction of drive torque into the drive configuration is accomplished on the drive side of the earth working machine.

BRIEF DESCRIPTION OF THE DRAWINGS

The present invention will be explained in further detail below with reference to the appended drawings, in which:

FIG. 3 is an enlarged partial longitudinal section view of the right (in FIG. 2) longitudinal end of the drive configuration and working apparatus;

FIG. 13A is a side view of a bearing component alternative to the one of FIG. 11A;

DETAILED DESCRIPTION

Figure 1:
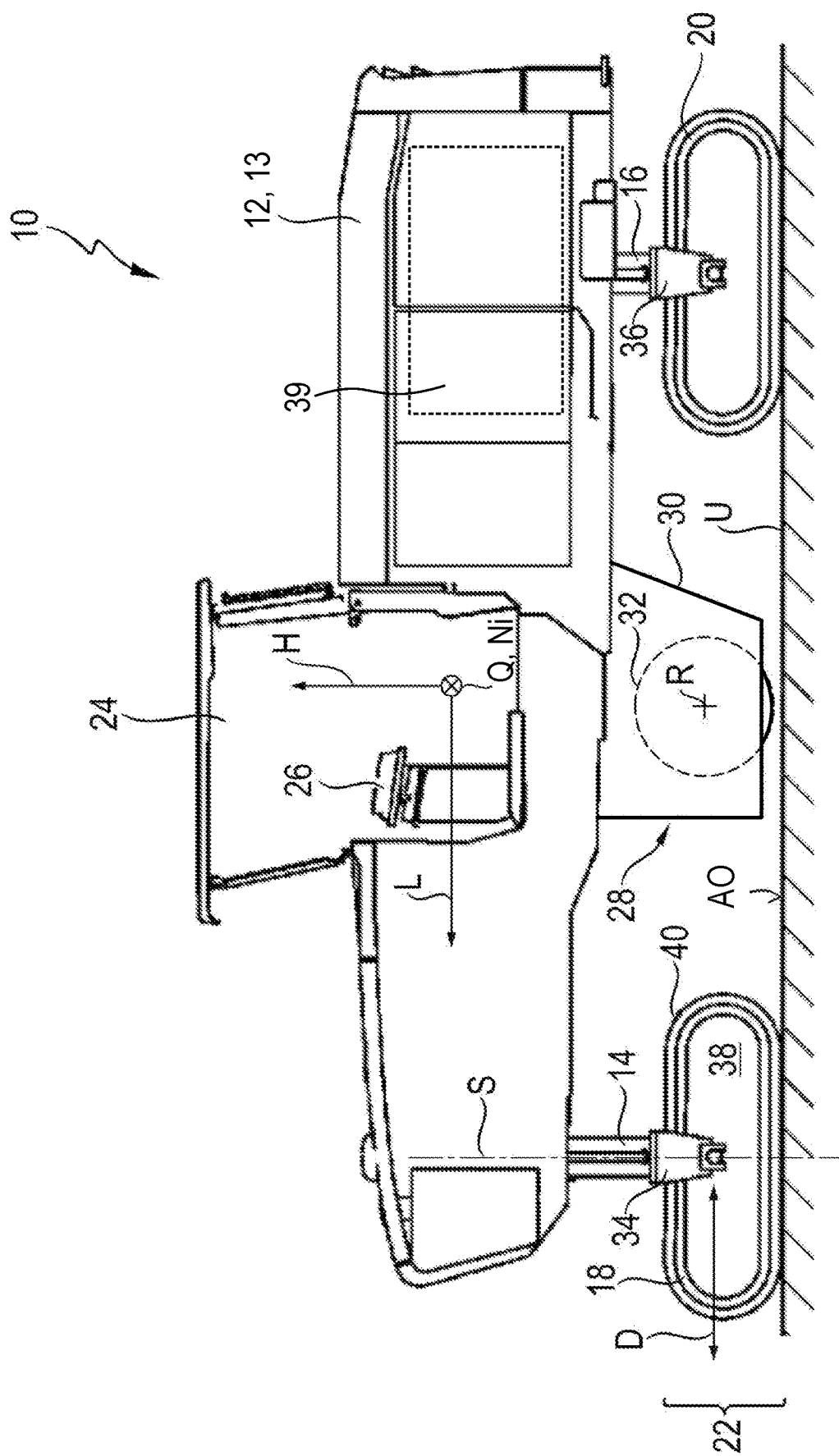
FIG. 1 is a schematic side view of an embodiment according to the present invention of an earth working machine in the form of a large milling machine, in a position for rolling travel operation.

In FIG. 1, an embodiment according to the present invention of an earth working machine in the form of a ground milling or road milling machine is labeled 10 in general. It encompasses a machine frame 12 that constitutes the basic framework for a machine body 13. Machine body 13 encompasses machine frame 12 and the components of machine 10 which are connected to the machine frame and are optionally movable relative thereto.

Machine body 13 encompasses front lifting columns 14 and rear lifting columns 16, which are connected at one end to machine frame 12 and at the other end respectively to front drive units 18 and to rear drive units 20. The distance of machine frame 12 from drive units 18 and 20 is modifiable by way of lifting columns 14 and 16.

Drive units 18 and 20 are depicted by way of example as crawler track units. In a departure therefrom, individual, or all, drive units 18 and/or 20 can also be wheel drive units.

The viewer of FIG. 1 is looking toward the earth working machine (or simply "machine") 10 in transverse machine direction Q that is orthogonal to the drawing plane of FIG. 1. A longitudinal machine direction orthogonal to transverse machine direction Q is labeled L and extends parallel to the drawing plane of FIG. 1. A vertical machine direction H likewise extends parallel to the drawing plane of FIG. 1 and orthogonally to longitudinal and transverse machine directions L and Q. The arrowhead of longitudinal machine direction L in FIG. 1 points in a forward direction. Vertical machine direction H extends parallel to the yaw axis of machine 10, longitudinal machine direction L extends parallel to the roll axis, and transverse machine direction Q extends parallel to pitch axis Ni.

Earth working machine 10 can comprise an operator's platform 24 from which a machine operator can control machine 10 via a control panel 26.

Arranged below machine frame 12 is a working assembly 28, here constituting, for example, a milling assembly 28 having a milling drum 32, received in a milling drum housing 30, that is rotatable around a milling axis R extending in transverse machine direction Q so that substrate material can be removed therewith during an earth working operation, starting from contact surface AO of substrate U to a milling depth determined by the relative vertical position of machine frame 12. Milling drum 32 is therefore a working apparatus within the meaning of the present Application.

The vertical adjustability of machine frame 12 by way of lifting columns 14 and 16 also serves to set the milling depth, or generally working depth, of machine 10 in the context of earth working. Earth working machine 10 depicted by way of example is a large milling machine, for which the placement of milling assembly 28 between the front and rear drive units 18 and 20 in longitudinal machine direction L is typical. Large milling machines of this kind, or indeed earth-removing machines in general, usually comprise a transport belt so that removed earth material can be transported away from machine 10. In the interest of better clarity, a transport belt that is also present in principle in the case of machine 10 is not depicted in FIG. 1.

It is not apparent from the side view of FIG. 1 that machine 10 comprises, in both its front end region and its rear end region, two respective lifting columns 14 and 16 each having a drive unit 18, 20 connected to it. Front lifting columns 14 are respectively connected to drive units 18, in a manner also known per se, by means of a drive unit connecting structure 34, for example a connecting fork fitting around drive unit 18 in transverse machine direction Q. Rear lifting columns 16 are connected to their respective drive unit 20 via a drive unit connecting structure 36 constructed identically to drive unit connecting structure 34. Drive units 18 and 20 are of substantially identical construction, and constitute propelling unit 22 of the machine. Drive units 18 and 20 are motor-driven, as a rule by a hydraulic motor (not depicted).

The drive energy source of machine 10 is constituted by an internal combustion engine 39 received on machine frame 12. In the exemplifying embodiment depicted, milling drum 32 is rotationally driven by it. The output of internal combustion engine 39 furthermore makes available on machine 10 a hydraulic pressure reservoir by means of which hydraulic motors and hydraulic actuators on the machine can be operated. Internal combustion engine 39 is thus also a source of the propulsive power of machine 10.

In the example depicted, drive unit 18, having a travel direction indicated by double arrow D, comprises a radially internal receiving and guidance structure 38 on which a circulating drive track 40 is arranged and is guided for circulating movement.

Lifting column 14, and with it drive unit 18, is rotatable around a steering axis S by means of a steering apparatus (not further depicted). Preferably additionally, but also alternatively, lifting column 16, and with it drive unit 20, can be rotatable by means of a steering apparatus around a steering axis parallel to steering axis S.

Figure 2:
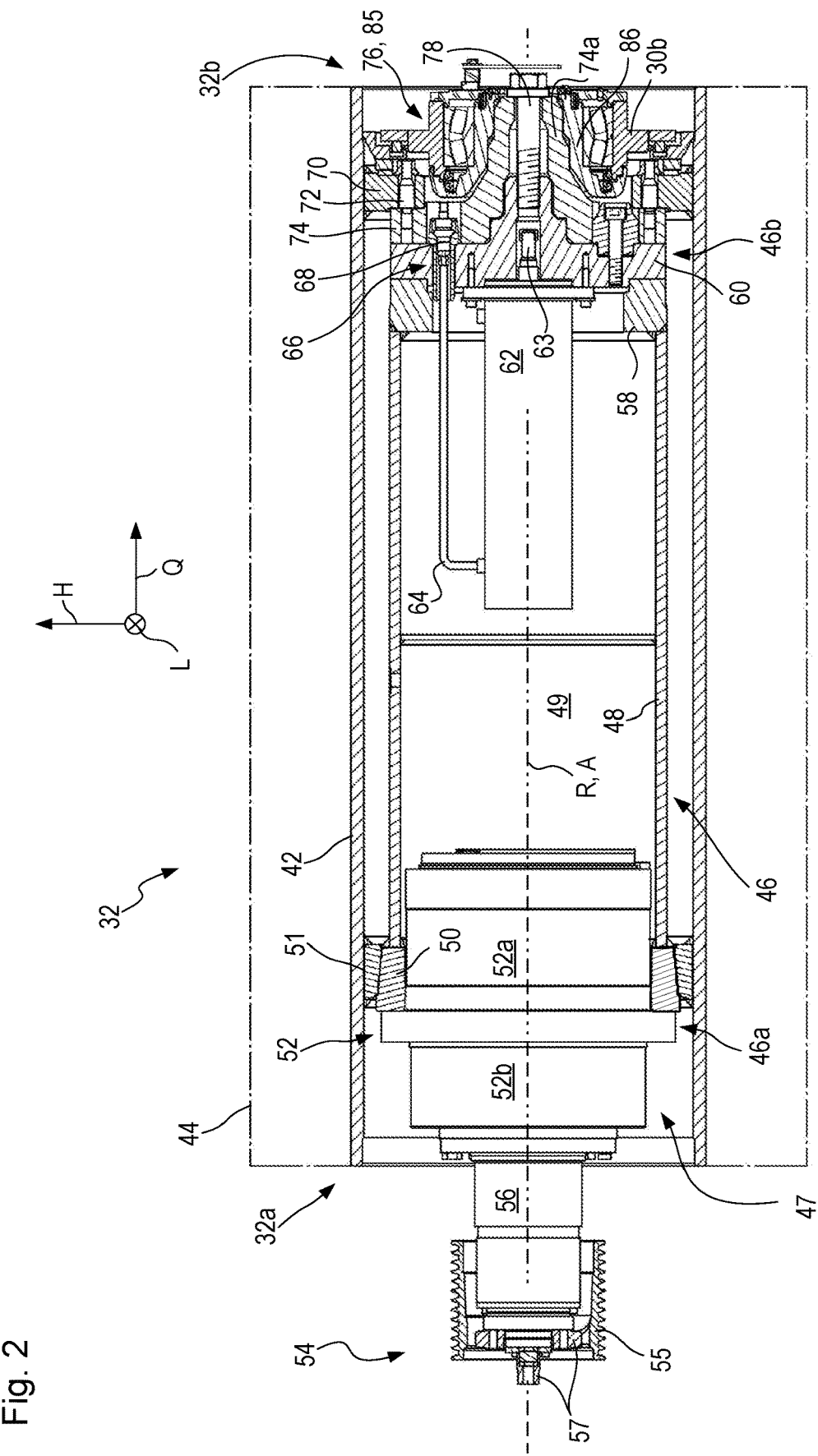
FIG. 2 is a schematic longitudinal section view through the working apparatus of the earth working machine of FIG. 1 in an operational state for earth working, in which the section plane contains the rotation axis of the working apparatus.

FIG. 2 is a longitudinal section view of milling drum 32 of FIG. 1 in a section plane containing rotation axis R of the milling drum.

Milling drum 32 encompasses a substantially cylindrical milling drum tube 42 on whose radially outer side bit holders or quick-change bit holders, having milling bits in turn received replaceably therein, are provided in a manner known per se. A dot-dash line 44 indicates the effective diameter (cutting cylinder) of milling drum 32, defined by the milling bit tips of the milling bits (not depicted). Milling drum 32 is in an operational condition ready for earth-removing work. Milling drum 32 is connected for that purpose in torque-transferring fashion to a drive configuration 46. Milling drum 32 radially externally surrounds drive configuration 46.

A planetary gearset that steps speed down and steps torque up is received in a transmission housing 52. A right (in FIG. 2) part 52a of transmission housing 52 is coupled to the ring gear of the planetary gearset for rotation together. A left (in FIG. 2) part 52b of transmission housing 52 is a machine frame-mounted part of machine body 13.

Drive configuration 46 encompasses an internal tube 48, a support cone 50, and part 52a, rotatable relative to machine frame 12, of transmission housing 52. Support cone 50 and internal tube 48 are connected to one another, and are connected as an assembly to transmission housing part 52a for rotation together around drive axis A of drive configuration 46. With milling drum 32 in the operational state, drive axis A of drive configuration 46 and rotation axis R of milling drum 32 are coaxial.

Milling drum tube 42 is braced against support cone 50 of drive configuration 46 by a negatively conical counterpart support cone 51.

Drive configuration 46 is furthermore connected to a drive torque-transferring arrangement 54 that, in the example depicted, encompasses inter alia a belt pulley 55. Belt pulley 55 is connected to an input shaft (not depicted in FIG. 2) of the planetary gearset in transmission housing 52. The input shaft, connected to belt pulley 55 for rotation together, extends through a shaft tunnel 56 that is machine frame-mounted in the exemplifying embodiment depicted and is rigidly connected to transmission housing part 52b.

Drive configuration 46 forms, with the machine frame-mounted assembly made up of transmission housing part 52b and shaft tunnel 56, a drive assembly 47 that projects axially into milling drum 32 from a drive axial end 32a of milling drum 32. Milling drum 32 preferably protrudes axially on both sides beyond drive configuration 46, constituting that part of drive assembly 47 which is rotatable relative to machine frame 12.

Drive assembly 47, and with it drive configuration 46, is mounted on machine body 13 in the region of shaft tunnel 56. The mounting of drive configuration 46 in the region of the rotatable transmission housing part 52a constitutes a locating bearing of drive configuration 46. Axial longitudinal end 46a, located closer to belt pulley 55, of drive configuration 46 is therefore also referred to as the "locating bearing-side" longitudinal end 46a.

Milling drum 32 extends axially, along its rotation axis (milling axis) R that coincides with drive axis A in the operational state, between drive axial end 32a located closer to drive torque-transferring arrangement 54 in FIG. 2 and a retention axial end 32b, located oppositely from the drive axial end, that is located closer to the axial positional retention point of milling drum 32 in the operational state.

At non-locating bearing-side longitudinal end 46b located axially oppositely from locating bearing-side longitudinal end 46a, drive configuration 46 comprises a support ring 58 and an end-located cover 60 connected to support ring 58. In the exemplifying embodiment depicted, support ring 58 is connected to internal tube 48 by welding. Cover 60 can likewise be welded, or also bolted, onto support ring 58. It is connected to support ring 58 and to internal tube 48 for rotation together around drive axis A.

Support ring 58 can be embodied in a variety of ways. Its conformation is not of essential importance. In the depictions of the present Application it is shown in a slightly differing form in each case, but this has no influence at all on the present invention.

The same is true of the radially external regions of cover 60 which interact with support ring 58 to constitute a nonrotatable connection.

In the first exemplifying embodiment depicted in FIG. 2, a hydraulic cylinder 62, which is arranged with its hydraulic cylinder axis coaxial with drive axis A of drive configuration 46, is received in interior 49 of drive configuration 46. Hydraulic cylinder 62 can be supplied with hydraulic fluid by means of a hydraulic connector line 64 through an energy passthrough opening 66 in cover 60.

Hydraulic connector line 64 ends, at its longitudinal end located remotely from hydraulic cylinder 62, in a coupling configuration 68 that is connectable, in order to supply hydraulic cylinder 62, to a counterpart coupling configuration of a supply line (not depicted) so that piston rod 63 can be extended from hydraulic cylinder 62 and retracted back into it. Two hydraulic connector lines 64 can be provided in order to operate a preferred double-acting hydraulic cylinder, one for each movement direction of piston rod 63.

Once axial positional retention, as shown in FIG. 2, of milling drum 32 on drive configuration 46 has been released, milling drum 32 can be axially pushed away from drive configuration 46 for deinstallation using piston rod 63, or pulled onto drive configuration 46 for installation.

A connecting ring 70 is arranged radially internally on milling drum tube 42 in a region located closer to retention axial end 32b, and is connected, by way of a welded join in the example depicted, to milling drum tube 42 for rotation together.

Milling drum tube 42 is rigidly connected to a connecting flange 74 via a connecting ring 70 by means of threaded studs 72.

Provided on connecting flange 74, preferably in one piece therewith, is a bearing stem 74a that protrudes axially in a first direction toward retention axial end 32b from a connecting region of connecting flange 74 with connecting tube 70.

With milling drum 32 in the operational state, a non-locating bearing 76 that braces drive configuration 46 is arranged on bearing stem 74a. Non-locating bearing 76, arranged at an axial distance from the locating bearing, can be pulled off axially from bearing stem 74a.

Non-locating bearing 76 can be received, for example, in a side plate or side door 30a (see FIGS. 3, 4, 6, 7, and 10) that is part of milling drum housing 30 and is end-located axially oppositely from milling drum 32 at retention axial end 32b. All that is shown in FIG. 2 is a component 30b, rigidly connected to such a side wall 30a, constituting a bearing surface for the outer bearing ring of non-locating bearing 76.

Side wall 30a, constituting side door 30a, is preferably provided pivotably on machine frame 12 so that drive configuration 46 and/or milling drum 32 in the interior of milling drum housing 28 can be made accessible by simply pivoting open and closed. Side door 30a is preferably pivotable around a pivot axis parallel to vertical machine direction H, since the pivoting of side door 30a then does not need to occur against gravity in any pivoting direction. Non-locating bearing 76, constituting non-locating assembly 85, is preferably mounted on side door 30a together with auxiliary component 86 (explained below) in such a way that the non-locating bearing, in particular constituting non-locating bearing assembly 85, is pivotable together with side door 30a. Opening side door 30a causes non-locating bearing 76, in particular non-locating bearing assembly 85, to be pulled axially off the bearing stem mounted by non-locating bearing 76. As is preferred, this can be bearing stem 74a that is connected to connecting flange 74. It can also be bearing stem (centering stem) 160a, described below in conjunction with the second exemplifying embodiment shown in FIG. 7, which protrudes axially from cover 160 of drive configuration 146 and passes through connecting flange 174.

Also preferably, the distance of the side door pivot axis from side door 30a is greater than the radius of the cutting cylinder, shown in FIG. 2, of milling drum 32, so that the circular path of non-locating bearing 76 or of non-locating bearing assembly 85 when pivoting together with side door 30a has the largest possible radius and thus the least possible curvature. This makes it easier to pull non-locating bearing 76, in particular non-locating bearing assembly 85, off the bearing stem that mounts milling drum 32 for rotation around its rotation axis R, or to pull it onto said bearing stem.

As will be explained in more detail with reference to the enlarged depiction in FIG. 3 of functional longitudinal end 46b of the drive configuration, milling drum 32 is retained in its axial position on drive configuration 46 only by a single central retaining bolt 78. Retaining bolt 78 constitutes a bolt arrangement of the present Application.

Milling drum 32 is thus braced on drive configuration 46, coaxially with drive axis A, against counterpart support cone 51 and against connecting flange 74.

In FIG. 3, support ring 58, cover 60, and connecting flange 74 have conformations that deviate slightly from what is depicted in FIG. 2. The conformations of the aforesaid components do not, however, differ sufficiently from what is depicted in FIG. 2 for those differences to have an influence on the implementation of the present invention.

Hydraulic cylinder 62, with its piston rod 63, is omitted from FIG. 3 in the interest of clarity. Threaded studs 72 for connecting connecting flange 74 to connecting ring 70 are also not depicted in the interest of clarity.

Embodied on cover 60, preferably in one piece therewith, is a centering configuration 60a in the form of a centering stem which protrudes from cover 60, in a direction away from the locating bearing-side longitudinal end of drive configuration 46, toward retention axial end 32b of milling drum 32. Centering stem 60a projects into a counterpart centering configuration 74b, embodied as a centering recess, on connecting flange 74, and thereby centers milling drum tube 42, connected rigidly to connecting flange 74, with respect to drive axis A. Connecting flange 74 is therefore a centering component recited in the introductory part of the description. The connecting flange 74 can be described as an annular connecting flange 74 having a central axis coincident with the drive axis A. Cover 60 comprises a central recess 60b, passing axially through it, through which piston rod 63 in FIG. 2 and FIG. 3 can pass axially.

At the end region facing toward retention axial end 32b of centering stem 60a, recess 60b in centering stem 60a is equipped with an internal thread into which the central retaining bolt 78 is threaded.

Although the bolt arrangement can also be embodied in several parts, for example by way of a threaded rod and a retaining nut optionally with a washer, rather than as a one-piece retaining bolt 78, the one-piece bolt arrangement in the form shown in FIG. 3 is preferred because of its simple and reliable handling and stowing capability. The central retaining bolt 78 encompasses a threaded shank 78a having an external thread, and a bolt head 78b projecting radially beyond threaded shank 78a and having a tool engagement configuration 78c known per se, for example in the form of a hex head polyhedron. Embodied between threaded shank 78a and tool engagement configuration 78c is an abutment portion 78d constituting an axially narrow but radially protruding cylinder. This abutment portion 78d is embodied in the present example in one piece with threaded shank 78a and tool engagement configuration 78c, but alternatively can also be provided as a separate washer.

Bolt head 78b thus clamps bearing stem 74a, and with it connecting flange 74 and with that in turn connecting ring 70 and milling drum tube 42, axially against support cone 50 of drive configuration 46.

When milling drum 32 is arranged axially at a distance from its operating position but still with a certain prepositioning, for example such that that longitudinal end of centering stem 60a which is located remotely from support ring 58 is already projecting into centering recess 74b of connecting flange 74, it is thus possible to move milling drum 32 with centering bolt 78 axially into its operating position. Care must simply be taken that pins 80 provided on cover 60 at a radial distance from drive axis A can travel into recesses 74c, provided for that purpose, of connecting flange 74, so as thereby to couple cover 60 to connecting flange 74 in order to transfer torque between drive configuration 46 and milling drum 32.

Axially "pulling" or clamping milling drum 32 onto drive configuration 46 by means of retaining bolt 78 requires only a comparatively low level of torque that can be introduced via tool engagement configuration 78c into retaining bolt 78 using conventional torque wrenches or also mechanized torque wrenches.

As an alternative to pulling or clamping milling drum 32 onto drive configuration 46 by means of retaining bolt 78, milling drum 32 can also be slid through the pivotable side door 30a onto drive configuration 46. During this sliding-on operation, not only is counterpart centering configuration 74b slid onto centering stem 60a, but non-locating bearing 76, in particular non-locating bearing assembly 85, is preferably also slid onto bearing stem 74a.

In order to facilitate the conveying, mentioned in the preceding paragraph, of milling drum 32 into an operational position simply by pivoting side door 30a into its closed position shown in FIGS. 3, 6, 7, and 10 in which it closes off milling drum housing 30, earth working machine 10 preferably comprises an actuator that assists the pivoting of side door 30a at least in a movement direction, and at least in a movement region containing the closed position. Particularly preferably, this is a final movement region in the context of the movement of side door 30a into the closed position. The force needed in order to slide milling drum 32 onto drive configuration 46, and also the force needed to slide non-locating bearing 76 or non-locating bearing assembly 85 onto bearing stem 74a, can thus be applied entirely or at least partly by the actuator. Such an actuator can comprise, for example, one or several piston/cylinder arrangements. The cylinder is preferably pivot-mounted on machine frame 12. When side door 30a has been brought sufficiently close to an engagement configuration of the piston rod and when the piston rod is extended, side door 30a can be brought into engagement with the engagement configuration of the piston rod, preferably into a positive engagement transferring a particularly large amount of force, so that the one or several piston/cylinder arrangements can then at least assist, preferably independently execute, the remainder of the closing movement of side door 30a.

Preferably the actuator can also assist or in fact execute the pivoting movement of side door 30a, together with non-locating bearing 76 or with non-locating bearing assembly 85, in an initial movement region of the pivoting movement of side door 30a out of the closed position toward the access position, non-locating bearing 76, in particular non-locating bearing assembly 85, being pulled off bearing stem 74a over that region. The actuator can also be an electromechanical actuator.

A retaining moment for axial positional retention of milling drum 32 on drive configuration 46 by way of retaining bolt 78 is, however, orders of magnitude greater. This is introduced into retaining bolt 78, in accordance with the present invention, as depicted in FIG. 4.

Figure 5:
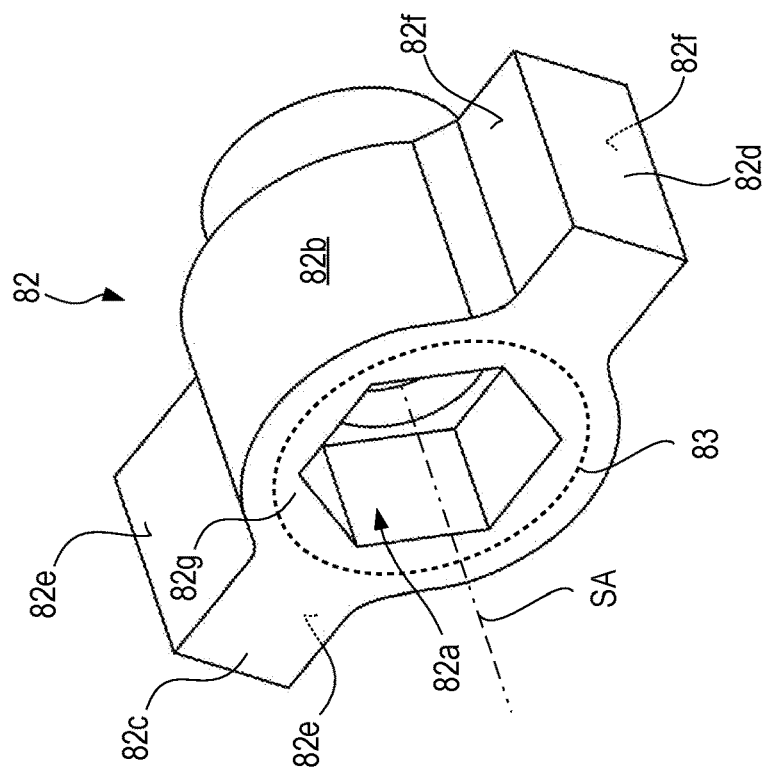
FIG. 5 shows, in isolation, the bolting moment bracing arrangement of FIG. 4 embodied as a tool arrangement.
Figure 4:
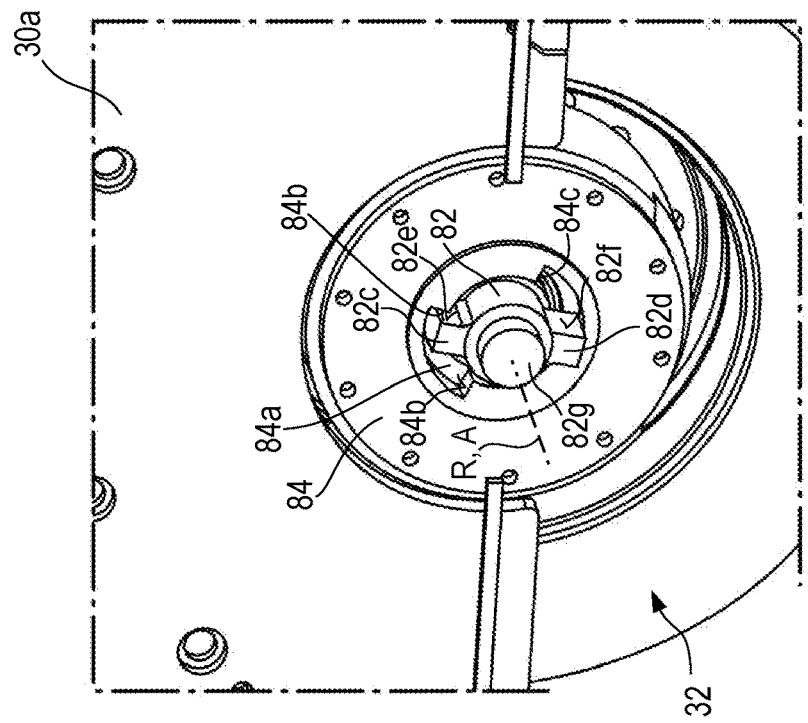
FIG. 4 is a perspective view of a bolting moment bracing arrangement for establishing and/or releasing axial positional retention of the milling drum on a drive configuration of the earth working machine.

FIGS. 4 and 5 depict a bolting moment bracing arrangement 82 used to establish and release axial positional retention of milling drum 32 on drive configuration 46. Bolting moment bracing arrangement 82 extends along a component axis SA that is coaxial with drive axis A when bolting moment bracing arrangement is placed onto retaining bolt 78.

Bolting moment bracing arrangement 82 is embodied as a fitover tool having an engagement region 82a (see FIG. 5)

that is embodied, in the example depicted, as a recess having a shape complementary to tool engagement configuration 78c of retaining bolt 78, i.e. in this case as a hex socket polyhedron. Bolting moment bracing arrangement 82 can thus be placed axially, with its engagement region 82a, onto bolt head 78b of retaining bolt 78. A torque can thus be transferred in positively engaging fashion between bolt 78 and bolting moment bracing arrangement 82.

Tool engagement configuration 78c of retaining bolt 78 thus constitutes a counterpart engagement region of engagement region 82a.

Engagement region 82a is provided on an engagement portion 82b of bolting moment bracing arrangement 82. Two projections 82c and 82d, for example, project from that engagement portion 82b radially (with reference to component axis SA) in diametrical opposition.

With bolting moment bracing arrangement 82 in the state, shown in FIG. 4, of being placed onto the central retaining bolt 78, bolting moment bracing arrangement 82 is radially externally surrounded by a counterpart bracing component 84 that is fixedly connected to side plate 30a of milling drum housing 30, for example by bolting. In the exemplifying embodiment depicted, counterpart bracing component 84 is arranged permanently on side plate 30a.

Counterpart bracing component 84 comprises a central recess 84a through which head 78b of retaining bolt 78 is axially accessible externally, i.e. from outside machine body 13, in order to place bolting moment bracing arrangement 82 thereonto and pull it off therefrom.

Recess 84a is (slightly) radially and (substantially) circumferentially larger than the corresponding respective radial and circumferential dimensions of engagement portion 82b having projections 82c and 82d. As a result, bolting moment bracing arrangement 82 can always be placed onto the retaining bolt regardless of the current rotational position of retaining bolt 78 that co-rotates with milling drum 32 during operation. Because, in the case of a hex head tool engagement configuration, the individual flat surfaces of tool engagement configuration are each rotated 60° with respect to their closest engagement surface in a circumferential direction, recess 84a preferably extends over at least 60° in the circumferential region that accommodates projections 82c and 82d.

Surfaces 82e, facing in a circumferential direction, of projection 82c, and surfaces 82f, facing in a circumferential direction, of projection 82d form bracing regions of bolting moment bracing arrangement 82; of these, surfaces 82e can come into abutment against flanks 84b and surfaces 82f can come into abutment against flanks 84c, which delimit in a circumferential direction those regions of recess 84a in which projections 82c and 82d are received when bolting moment bracing arrangement 82 is in place. The two flanks 84b facing in a circumferential direction, and the two flanks 84c facing in a circumferential direction, of recess 84a thus form counterpart bracing regions of counterpart bracing component 84.

It is thus possible, as necessary, to place bolting moment bracing arrangement 82 axially onto bolt head 78 without further preparatory handling, and to cause drive configuration 46 to rotate around drive axis A. This can occur either by way of internal combustion engine 39 and drive torque-transferring arrangement 54, or by way of a rotational drive (not depicted in the Figures) that can be coupled via coupling configuration 57 onto belt pulley 55 and thus indirectly onto drive configuration 46 for torque transfer. Merely for the sake of completeness, be it noted that coupling configuration 57 can be provided at any point on drive torque-transferring arrangement 54, so long as the drive configuration can be caused to rotate around drive axis A by actuating coupling configuration 57. The rotational drive that can be coupled to coupling configuration 57 can also be a manual rotational drive.

Thanks to the planetary gearset arranged between drive torque-transferring arrangement 54 or coupling configuration 57 on the one hand, and cover 60 or its centering stem 60a in transmission housing 52 on the other hand, because of the large torque step-up ratio of the planetary gearset a torque of more than 2500 Nm or even more than 3000 Nm can be achieved with a comparatively low input-side torque, for example in the range from 250 to 300 Nm, at centering stem 60a that carries the internal thread for retaining bolt 78.

After bolting moment bracing arrangement 82 is placed onto retaining bolt 78, a rotation of drive configuration 46 causes flanks 82e and 82f to come into abutment, depending on the direction of the rotational movement of drive configuration 46, against flanks 84b, 84c, facing in a circumferential direction, of recess 84a of counterpart bracing component 84. As a result of the positive engagement of engagement region 82a with bolt head 78b of the retaining bolt, a drive torque introduced into drive configuration 46 on the locating-bearing side of drive configuration 46 is braced by positively engaging abutment between projections 82c and 82d and counterpart bracing component 84 on the non-locating-bearing side of drive configuration 46. This ensures that as rotational driving of drive configuration 46 continues, a relative rotation occurs between retaining bolt 78 and drive configuration 46, and a helical movement of retaining bolt 78 relative to drive configuration 46 (in the example depicted, relative to centering stem 60a) thus occurs. Retaining bolt 78 can thus be tightened or loosened with an extremely high torque as a result of the bracing effect of bolting moment bracing arrangement 82 in interaction with counterpart bracing component 84.

Axial positional retention of milling drum 32 relative to drive configuration 46 can be established and released without tools with the exception of bolting moment bracing arrangement 82.

Counterpart bracing component 84 can remain permanently on machine body 13, more precisely on the end-located side wall 30a of milling drum housing 30.

FIG. 4 is a view of the so-called "idle" side of earth working machine 10, i.e. that side of machine 10 which faces away from the viewer in FIG. 1. In FIG. 1 the viewer is looking at the oppositely located so-called "drive" side of machine 10. With machine 10 in the operational state, drive axial end 32a of milling drum 32 is located closer to the drive side of machine 10, and retention axial end 32 is closer to the idle side. The idle side of earth working machine 10 is usually the right side in a forward travel direction.

Once axial positional retention has been established, drive configuration 46 can be driven a little way in the opposite rotation direction in order to release the abutment between flanks 82e, 82f of projections 82c and 82d of bolting moment bracing arrangement 82 and flanks 84b, 84c of counterpart bracing component 84, so that bolting moment bracing arrangement 82 can be manually pulled off axially from retaining bolt 78 with little force.

In FIG. 5, dashed line 83 shows a possible physical separation between engagement portion 82b comprising projections 82c and 82d, and a radially inner core portion 82g comprising engagement region 82a. Engagement portion 82b and core portion 82g can be connected by a test apparatus, concealed by the aforesaid portions, that is embodied to allow a torque that is transferred between engagement portion 82b and core portion 82g to be capable of being checked. For example, the test apparatus can be a slip coupling that permits a torque transfer between engagement portion 82b and core portion 82g only up to a predetermined limit torque or a limit torque predeterminable by an adjustment action, and/or the test apparatus can output a signal, for example a sound, for example a click that is known from mechanical torque wrenches, when the limit torque is reached.

The bolting moment bracing arrangement can, however, also be embodied in one piece.

Figure 6:
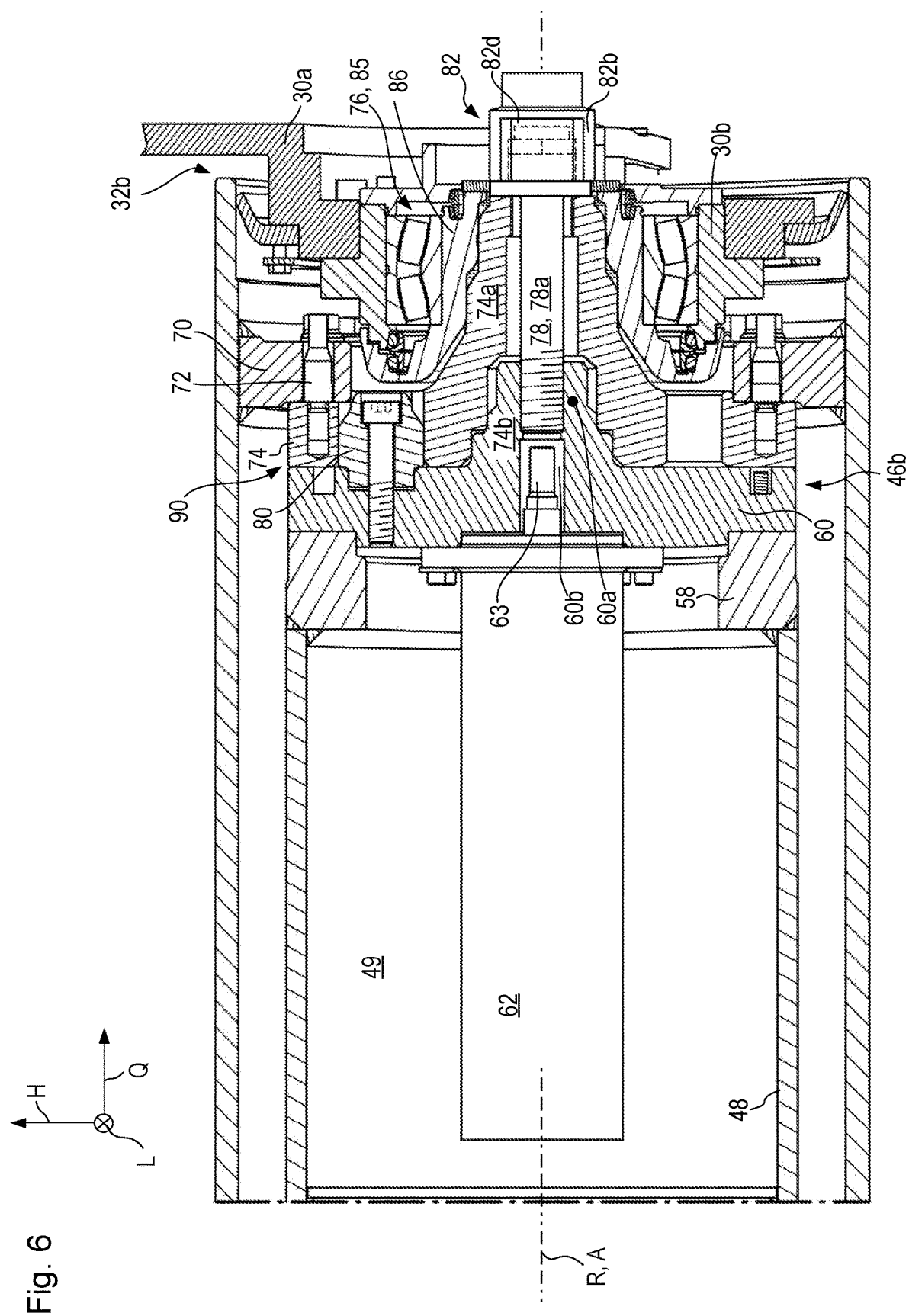
FIG. 6 is a partial longitudinal section view, corresponding in terms of essential constituents to FIG. 3, of the right longitudinal end region of the drive configuration and milling drum, having a bolting moment bracing arrangement according to FIGS. 4 and 5 arranged on the bolt arrangement.

FIG. 6 depicts what is shown in FIGS. 2 and 3, with bolting moment bracing arrangement 82 placed onto bolt head 78b. Bolting moment bracing arrangement 82 is not sectioned.

Projection 82d extends orthogonally to the drawing plane of FIG. 6 toward the viewer. Projection 82c is located behind the drawing plane in FIG. 6 and is concealed by engagement portion 82b. The counterpart bracing component is not shown in FIG. 6.

Figure 7:
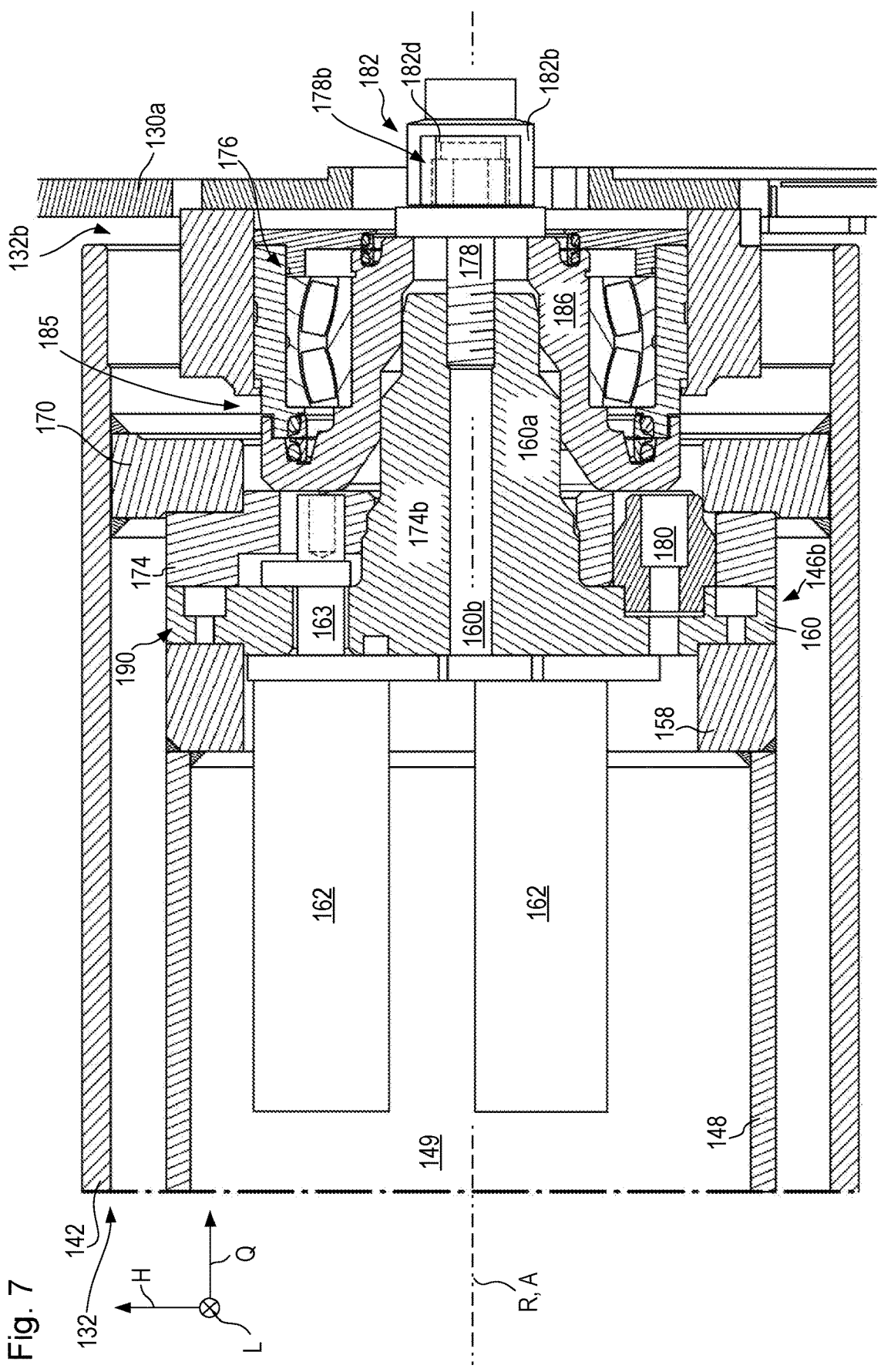
FIG. 7 is a longitudinal section view, corresponding to the view of FIG. 6, of an alternative embodiment of the drive configuration and milling drum.

FIG. 7 shows a second embodiment of working assembly 28.

Components and component portions identical and functionally identical to those in the first embodiment are labeled in the second embodiment with the same reference characters but incremented by 100. The second embodiment of FIG. 7 is explained below only insofar as it differs from the first embodiment to an extent essential in terms of the invention.

An essential modification of the second embodiment as compared with the previously described first embodiment is the conformation of centering stem 160a, which both acts as a centering configuration with respect to connecting flange 174 of milling drum 132 and serves as a bearing stem with respect to non-locating bearing 176.

Counterpart centering configuration 174b is thus once again embodied as a recess. In contrast to the first embodiment, in the second exemplifying embodiment centering stem 160a not only projects axially into connecting flange 174 but passes axially completely through it.

The result, as a consequence of the design, is that retaining bolt 178 can no longer impinge upon connecting flange 174 directly with axial force and displace it into the operating position, or retain milling drum 132 axially in the operating position via connecting flange 174. In the second embodiment, an axial force transfer between retaining bolt 178 and connecting flange 174 connected rigidly to milling drum 132 occurs with interposition of an auxiliary component 186 between bolt head 178b and connecting flange 174. Auxiliary component 186 is advantageously part of non-locating bearing 176, and serves in that context as a bracing component for the inner ring of the rolling bearing of non-locating bearing 176. Auxiliary component 186 is braced firstly against bolt head 178b, and then against connecting flange 174.

What is stated above in conjunction with the sliding of non-locating bearing 76 or non-locating bearing assembly 85 onto bearing stem 74a and in conjunction with the pulling of non-locating bearing 76 or non-locating bearing assembly 85 off bearing stem 74a, by way of a pivoting movement of non-locating bearing 76 or non-locating bearing assembly 85 together with side door 30a, also applies to such sliding or pulling of non-locating bearing 176, in particular of non-locating bearing subassembly 185, respectively onto and off centering stem 160a, which interacts with auxiliary component 186 for rotational mounting of milling drum 132 in the same way as bearing stem 74a of the first embodiment.

In addition, in the second embodiment a central hydraulic cylinder is not provided; instead several, for example three, hydraulic cylinders 162 are arranged with a (preferably equidistant) distribution around drive axis A in a circumferential direction and with a (preferably identical) radial spacing from drive axis A. Because each of the hydraulic cylinders 162 now needs to supply only a third of the force originally to be applied by central hydraulic cylinder 162 alone, each of the hydraulic cylinders 162 can advantageously end up being smaller than central hydraulic cylinder 162 of the first embodiment. There are, however, more of them.

With hydraulic cylinders 162, milling drum 132 can again be moved axially in a direction toward the operating position, preferably into the operating position, with corresponding rear engagement components being arranged at the free longitudinal end of piston rod 163 (not depicted). Milling drum 132 can likewise be hydraulically moved axially out of the operating position.

FIG. 8 shows, once again with reference to the first exemplifying embodiment, the advantageous use of a release component 88. With the aid of release component 88, milling drum 32 can be released axially out of its operating position from the locating bearing-side longitudinal end 46a of drive configuration 46, and pulled off, by way of a single central force engagement. Release component 88 can therefore be used, alternatively to hydraulic cylinder or cylinders 62 and 162, to move milling drum 32 out of the operating position.

Figure 8:
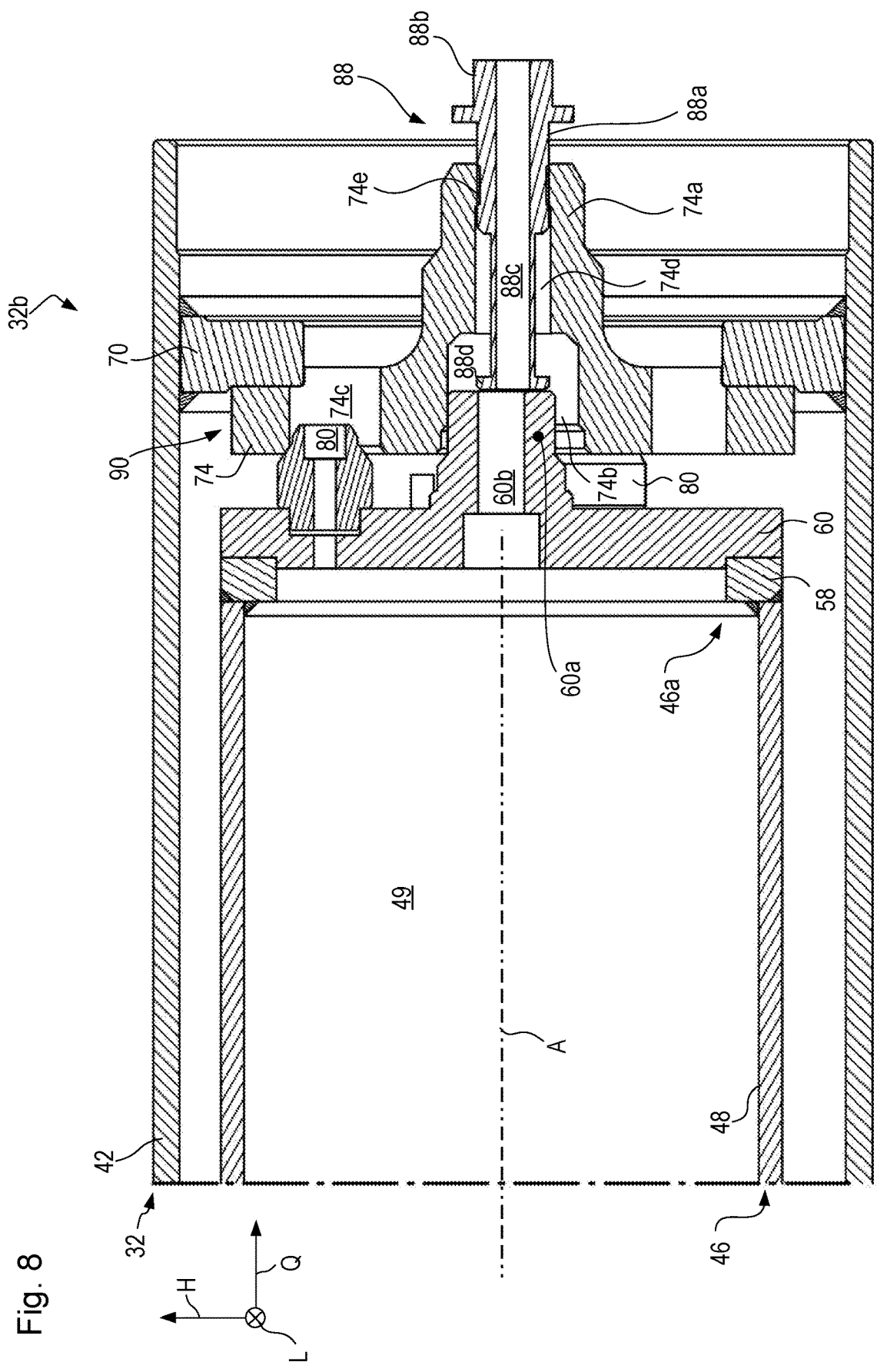
FIG. 8 shows a drive configuration and milling drum, corresponding substantially to the embodiments of FIGS. 3 and 6, having a release component for pulling the milling drum axially off the drive configuration.

In FIG. 8, milling drum tube 42 and thus milling drum 32 have already been moved axially out of the operating position by the use of release component 88 so that centering stem 60a, constituting a centering configuration, no longer centers counterpart centering configuration 74b on connecting flange 74. Milling drum tube 42 is therefore no longer coaxial with drive axis A of drive configuration 46.

The use of release component 88 on the drive assembly or milling assembly of FIG. 8 will be described not only with reference to FIG. 8 but also with reference to release component 88 shown in isolation in FIG. 9.

Figure 9:
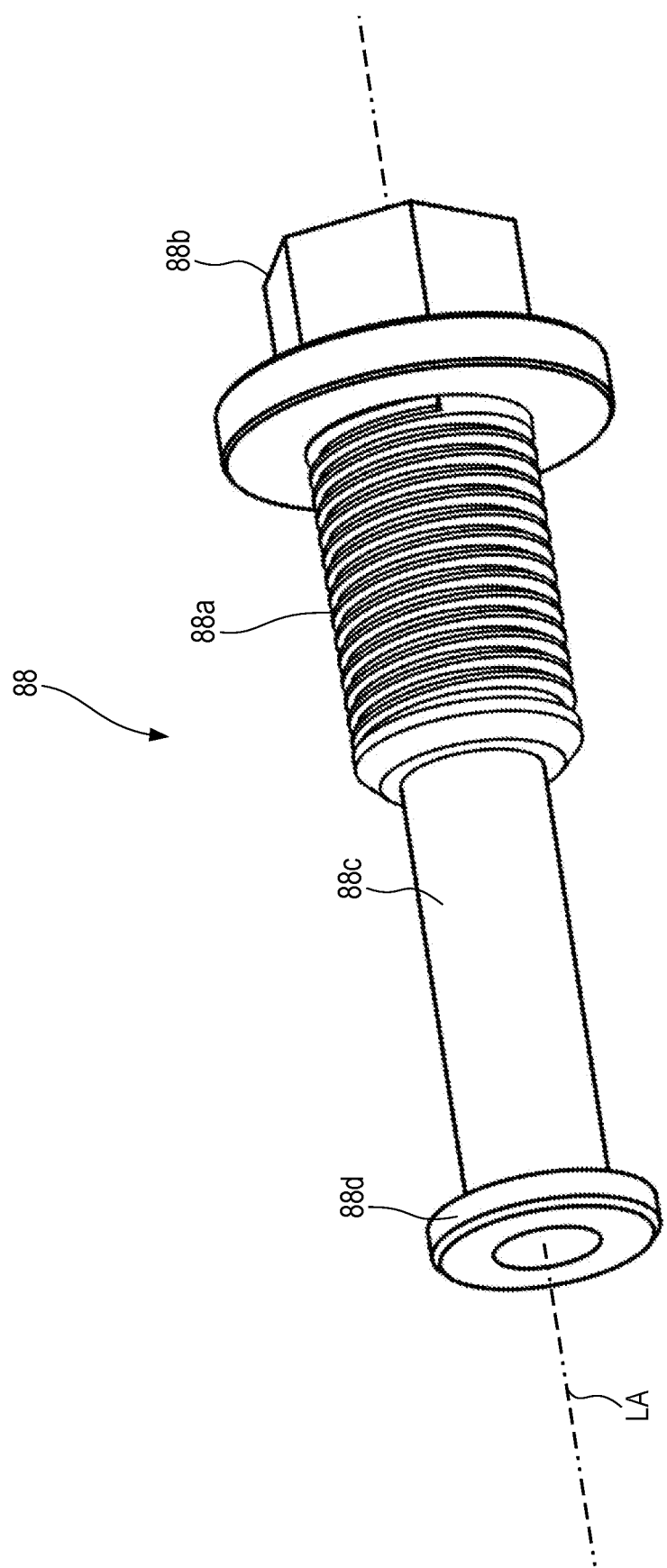
FIG. 9 shows the release component of FIG. 8 in isolation.

As is evident from FIG. 9, release component 88 extends along a release component axis LA that, when utilization of release component 88 begins, is preferably coaxial with drive axis A of drive configuration 46 and with rotation axis R of milling drum 32.

Release component 88 comprises a cooperating configuration 88a, for example in the form of an external thread, that can be bolted into bearing stem 74a of connecting flange 74. Bearing stem 74a has for that purpose a passthrough opening 74d, passing axially through it, through which counterpart centering configuration 74b in the form of a centering recess is reachable. At the longitudinal end region located remotely from centering recess 74b, bearing stem 74a has, in passthrough opening 74d, internal thread 74e that can be brought into bolting engagement with external thread 88a (cooperating configuration) of release component 88 so that release component 88 on the one hand can be secured on a component connected rigidly to milling drum 32, and on the other hand can be advanced axially relative thereto in defined fashion.

At its longitudinal end that is located remotely from drive configuration 46 in the utilization state, i.e. when cooperating configuration 88a is bolted into internal thread 74e, release component 88 comprises a torque-transferring configuration 88b, for example in the form of a hex head tool engagement configuration and/or a hex socket tool engagement configuration. Preferably both tool engagement configurations are implemented on torque-transferring configuration 88b. Torque can be introduced into release component 88 at this torque-transferring configuration 88b while release component 88 is in use on earth working machine 10, in order to move said component axially relative to milling drum 32 with the aid of cooperating configuration 88a. A torque wrench or a mechanized torque wrench can engage onto torque-transferring configuration 88b.

With a correspondingly axially protruding conformation of the counterpart bracing component or at least of a counterpart bracing region interacting with a bracing region of the bolting moment bracing arrangement, the bolting moment bracing arrangement can also be employed for torque bracing of the release component. The working apparatus can then be pushed off the drive configuration without tools, except for a release component and bolting moment bracing arrangement. At the least, the torque required for pushing it off does not necessarily have to be applied manually by an operator. Advantageously, the release component therefore comprises a tool engagement configuration (here: torque-transferring configuration 88b) identical to the bolt component of the bolt arrangement (here: retaining bolt 78), so that the engagement region of the bolting moment bracing arrangement also fits onto the tool engagement configuration of the release component.

A shank portion 88c is adjacent to cooperating configuration 88a at the latter's longitudinal end located oppositely from torque-transferring configuration 88b. To reduce the weight of release component 88, shank portion 88c is preferably embodied in tubular fashion, i.e. is radially internally hollow. At that longitudinal end of shank portion 88c which is located oppositely from cooperating configuration 88a, release component 88 comprises an abutment portion 88d that can be embodied, for example, as a disk, in particular an annular disk, projecting radially beyond shank portion 88c. By advancing, release component 88 can be brought into abutting engagement at abutment portion 88d with drive configuration 46, here in particular into abutting engagement with a longitudinal end region of centering stem 60a of cover 60. Internal thread 74e is thus a fastening and/or advancing configuration within the meaning of the introductory part of the description.

Once abutting engagement has been established between abutment portion 88d and drive configuration 46, connecting flange 74 that comprises fastening and/or advancing configuration 74e, and is fixedly connected to milling drum 32 or to milling drum tube 42, can be caused to move axially relative to drive configuration 46 by further introduction of torque into torque-transferring configuration 88b.

Depending on the transfer of movement and force between cooperating configuration 88a and fastening and/or advancing configuration 74e, for example as a function of the pitch of the thread that is used, a large axial force, with which even a dirt-caked milling drum 32 can be axially released from drive configuration 46, can be generated at the site of the abutting engagement of abutment portion 88d against drive configuration 46.

Once such a dirt jam has been released, i.e. once milling drum 32 has been made axially movable relative to drive configuration 46, the applied force necessary for axial removal of milling drum 32 from drive configuration 46 can be reduced to the usual level known for moving the massive components, and can be managed with usual methods known per se.

As is evident from FIG. 8, release component 88 can also be embodied to be continuously hollow, i.e. as a tubular release component, so that drive configuration 46, or at least components thereof, can be accessible, even during utilization of release component 88, through an opening that passes through release component 88 along its release component axis LA. Like bolting moment bracing arrangement 82, release component 88 is preferably embodied in one piece.

Figure 10:
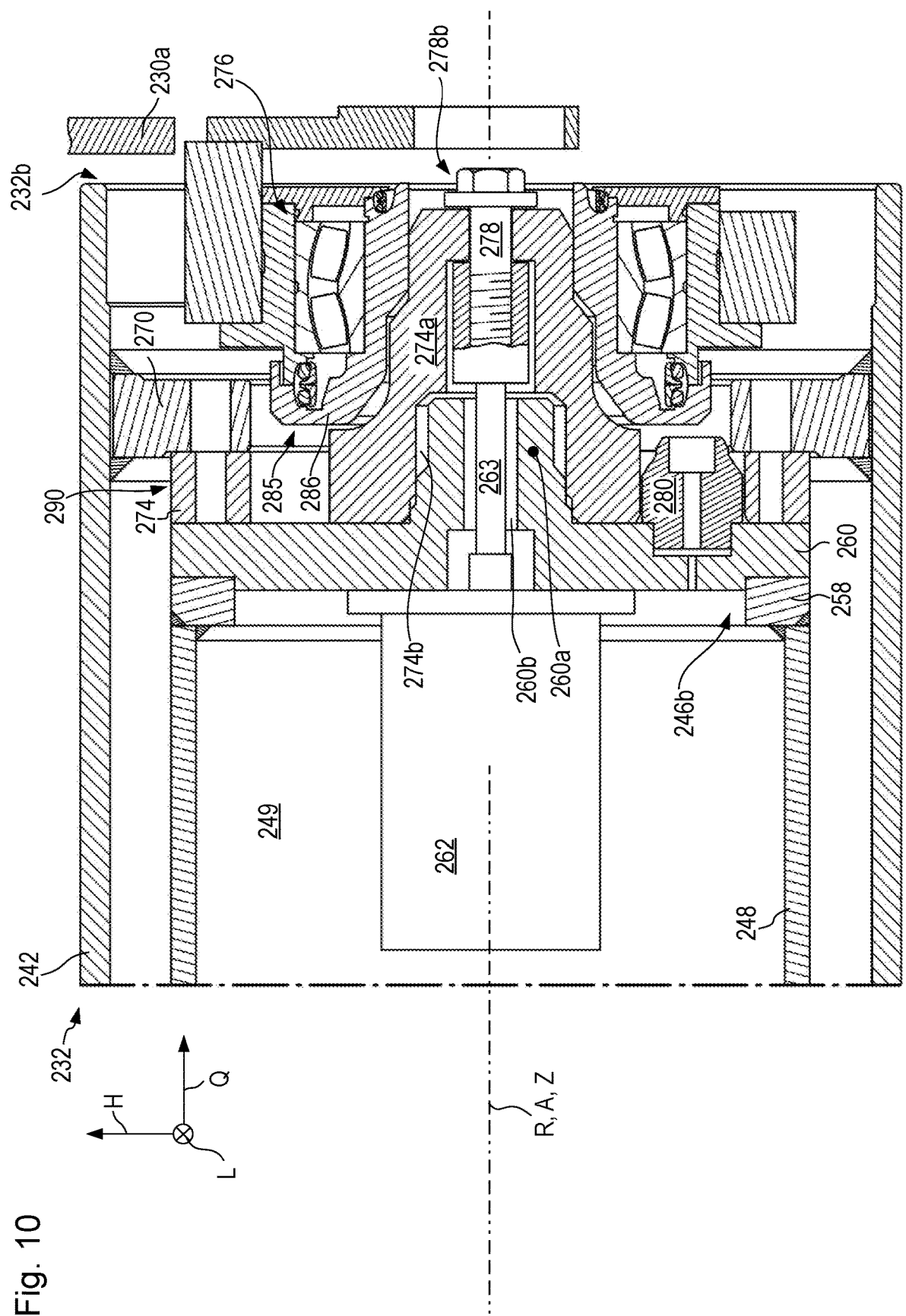
FIG. 10 shows a third embodiment of the drive configuration and milling drum in a partial longitudinal section view corresponding to FIGS. 3 and 6 to 8.

Lastly, FIG. 10 depicts a third embodiment that is intended simply to show that central retaining bolt 278 can also be bolted to piston rod 263 of hydraulic cylinder 262 for axial positional retention of milling drum 32 on drive configuration 46.

Components and component portions identical and functionally identical to those of the first embodiment are labeled in the third embodiment with the same reference characters but incremented by 200. The third embodiment of FIG. 10 will be explained here only insofar as it differs from the first embodiment to an extent essential in terms of the invention.

The third embodiment depicted in FIG. 10, having retaining bolt 278 threaded into piston rod 263, is of course also applicable to the design of the second embodiment in which centering stem 60a and bearing stem 74a are implemented in a single component. All that is then necessary is for bolt head 278b to brace against an auxiliary component that transfers force from bolt head 278b onto a component rigidly connected to milling drum 232, as is the case in FIG. 7 with auxiliary component 186. A component that is present in any case, for example a portion of non-locating bearing 276, is once again preferably used as an auxiliary component.

The approach in accordance with the third embodiment as shown in FIG. 10 has the advantage that milling drum 232 can be pulled axially onto the drive configuration and conveyed into the operating position, and also pushed axially off drive configuration 246 and removed from the operating position, using hydraulic cylinder 262. For both installation and deinstallation of milling drum 232, the axial forces required for the axial movement of milling drum 232 are furnished by hydraulic cylinder 262. Axial positional retention with the aforementioned very high torque is once again accomplished, as described in conjunction with FIGS. 4 to 7, thanks to bolting moment bracing arrangement 82, 182 that interacts with counterpart bracing component 84, and with an introduction of torque on the locating bearing side of drive configuration 246 either by internal combustion engine 39 or by a separate rotational drive (including a manual one, if desired) that, as has already been described above, can be temporarily couplable to a coupling configuration 57 (see FIG. 2) of the drive torque-transferring arrangement for torque transfer.

A preferred embodiment of a bearing component 90 which makes it easier to slide a non-locating bearing 76, 176, 276, in particular a non-locating bearing assembly 85, 185, 285, onto a bearing stem 74a, 160a, 274a and to pull it off therefrom, by a pivoting movement together with a side door 30a, 130a, 230a, will be described below in conjunction with FIGS. 11A to 14.

A bearing component 90 having a bearing stem 74a is shown by way of example. The statements made below for bearing stem 74a also apply to the conformation, interacting with bearing assembly 185, of centering stem 160a.

Figure 11B:
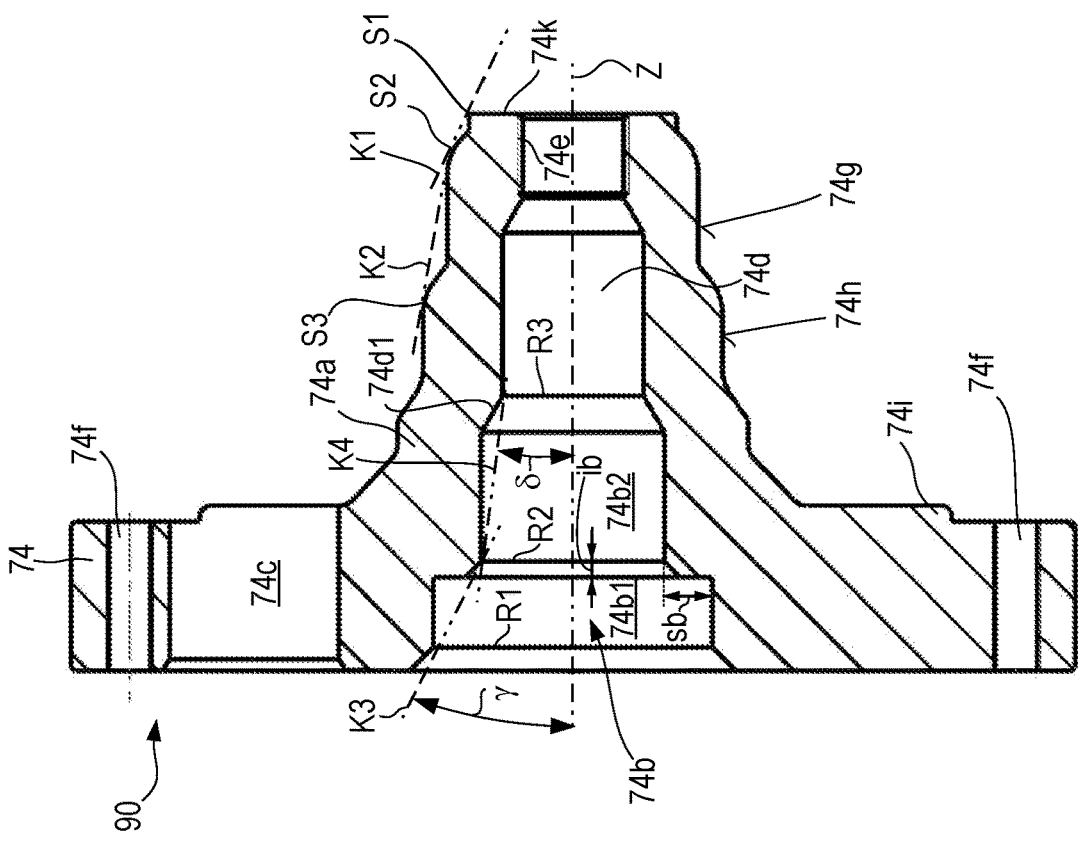
FIG. 11B is a longitudinal section view of the bearing component of FIG. 11A.
Figure 11A:
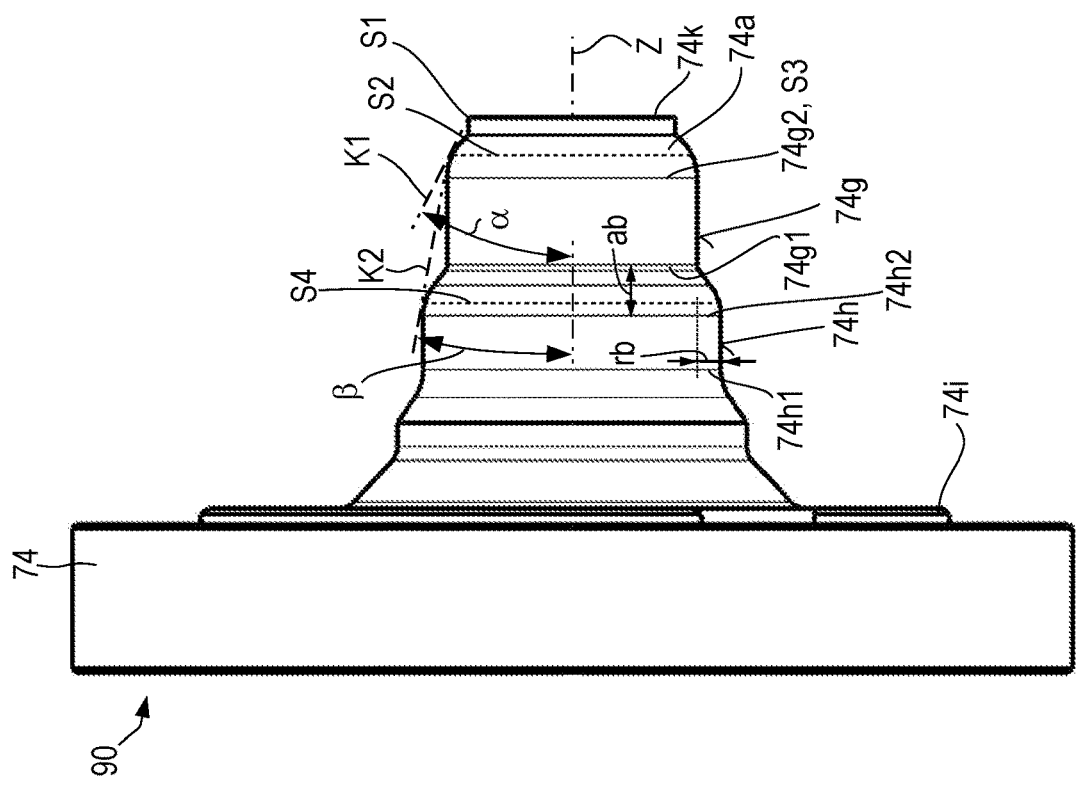
FIG. 11A is a side view of a preferred bearing component encompassing a connecting flange and a bearing stem, protruding therefrom, as shown in FIG. 6.

FIG. 11A depicts a separately handleable bearing component 90 and shows in isolation, in a side view, connecting flange 74 already depicted in FIG. 6 having bearing stem 74a protruding therefrom. FIG. 11B shows the same bearing component 90 in a longitudinal section view that contains central bearing stem axis Z of bearing stem 74a. With milling drum 32 in the operational position, bearing stem axis Z ideally coincides collinearly with rotation axis R and with drive axis A.

Bearing component 90, preferably embodied in one piece, radially externally comprises a plurality of passthrough openings 74*f* into which the aforementioned threaded studs 72 can be threaded in order to connect connecting flange 74, and thus bearing component 90, nonrotatably to connecting ring 70 and thus to milling drum tube 42. Passthrough openings 74, which alternatively but not preferably can also be blind openings, are preferably all located at the same radial distance from bearing stem axis Z, and are preferably at the same angular distance from one another (see FIG. 12).

Three recesses 74*c*, for positively engaging torque-transferring reception as described above of pins 80 nonrotatably connected to cover 60, are preferably also embodied equidistantly in terms of angle but at a shorter distance from bearing stem axis Z than passthrough openings 74*f*.

Bearing component 90 comprises, on its side having stem 74*a*, a circumferential projection 74*i* that is interrupted only by recesses 74*c*. As is evident from FIG. 6, this projection 74*i* serves to center bearing component 90 with reference to connecting ring 70. A comparatively small projection distance for projection 74*i*, as compared with the protrusion distance of stem 74*a*, is therefore sufficient.

Bearing stem 74*a* comprises two cylindrical bearing surfaces 74*g* and 74*h* against which hollow-cylindrical counterpart bearing surfaces of non-locating bearing assembly 85, more precisely of auxiliary component 86, circumferentially abut when milling drum 32 is in the operational state. A first cylindrical bearing surface 74*g* is farther from connecting flange 74, which constitutes an exemplifying protrusion structure from which bearing stem 74*a* protrudes, than second cylindrical bearing surface 74*h*. With these two cylindrical bearing surfaces, milling drum 32 can be mounted with sufficient accuracy for rotation around rotation axis R. To make it easier to pull non-locating bearing assembly 85 off bearing stem 74*a*, and to slide it thereonto, by means of a pivoting movement of non-locating bearing assembly 85 together with side door 30*a*, first cylindrical bearing surface 74*g* has a smaller diameter than second cylindrical bearing surface 74*h*. The connecting ring 70 and connecting flange 74 can collectively be referred to as a protrusion structure 70, 74. As seen for example in FIG. 8, the cylindrical bearing surfaces 74*g* and 74*h* are spaced from any other part of the protrusion structure 70, 74 and the milling drum tube 42 and this allows the cylindrical bearing surfaces 74*g* and 74*h* to be supportingly received within the non-locating bearing assembly 85 when the replaceable milling drum 32 is mounted on the earth working machine 10.

As a very general principle, the two cylindrical bearing surfaces can have different axial lengths, the smaller-diameter cylindrical bearing surface, in this instance bearing surface 74*g*, then preferably being the axially longer one.

Also preferably, the axial spacing ab between first cylindrical bearing surface 74*g* and second cylindrical bearing surface 74*h* is greater than the radial spacing rb between those surfaces.

Bearing stem 74*a* preferably tapers toward its free longitudinal end 74*k* located remotely from protrusion structure 74, as a rule in steps because of cylindrical bearing surfaces 74*g* and 74*h*, the degree of taper preferably increasing with increasing distance from protrusion structure 74. The free longitudinal end 74*k* may be referred to as a first axial end 74*k*. An opposite end of the bearing component 90 from the first axial end 74*k* may be referred to as a second axial end.

Figure 13B:
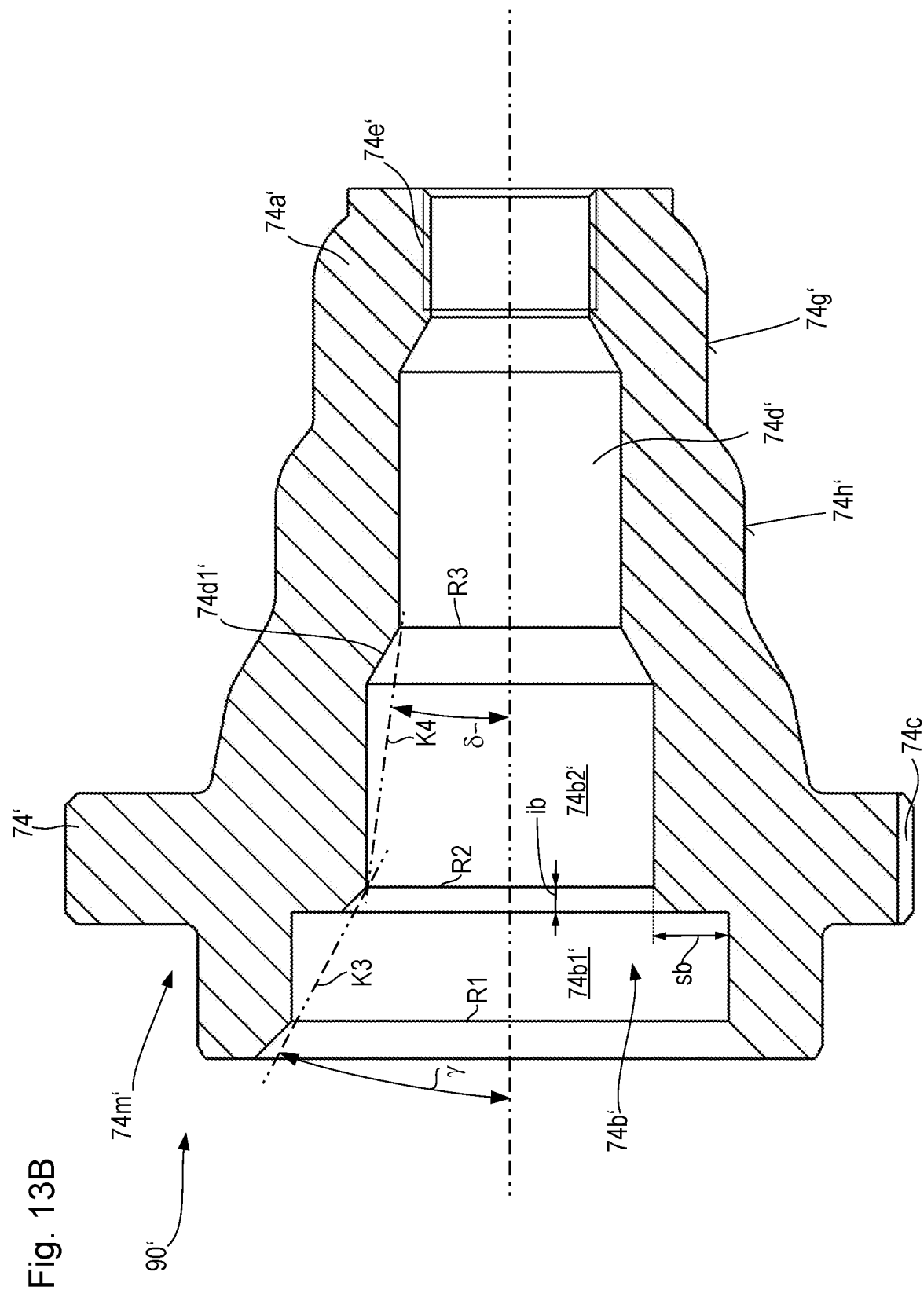
FIG. 13B is a longitudinal section view of the bearing component of FIG. 13A.

In the preferred embodiment of bearing component 90 or 90' depicted in FIGS. 11 and 13, this becomes evident in the axial portion, relevant for sliding non-locating bearing assembly 85 on together with side door 30*a* during a pivoting movement, that extends from longitudinal end 74*h*1, located axially closer to protrusion structure 74, of second cylindrical bearing surface 74*h* to free longitudinal end 74*k* of bearing stem 74*a*. The bearing stem can be embodied in such a way that the degree of taper firstly decreases with increasing distance from protrusion structure 74 in a region located closer to protrusion structure 74 than to longitudinal end 74*k*, and increases, as the free axial longitudinal end 74*k* is approached, in a region located closer to longitudinal end 74*k* than to protrusion structure 74.

This axial portion is embodied in such a way that a first notional cone K1, constituting a first osculating circle S1, comprises an outer circumferential line of free longitudinal end 74*k*. Cone K1 abuts tangentially against this first osculating circle S1, and extends from there toward first cylindrical bearing surface 74*g*. Cone K1 abuts tangentially against a second osculating circle S2 on the outer surface of bearing stem 74*a*. Osculating circle S2 is located axially between first osculating circle S1 and axial end 74*g*2, located closer to free longitudinal end 74*k*, of first cylindrical bearing surface 74*g*. First notional cone K1 has an opening angle α.

A second notional cone K2 proceeds from axial end 74*g*2, located closer to free longitudinal end 74*k*, of first cylindrical bearing surface 74*g*, constituting its first osculating circle or starting circle S3, and extends to a second osculating circle S4 on the outer surface of bearing stem 74*a*, against which cone K2 abuts tangentially. This osculating circle S4 is located axially between axial end 74*g*2 and axial end 74*h*2, located closer to free longitudinal end 74*k*, of second cylindrical bearing surface 74*h*. Second notional cone K2 abuts tangentially against osculating circle S4 but not against osculating circle or starting circle S3, and has an opening angle β.

Bearing stem 74*a* is embodied in such a way that the opening angle α of first notional cone K1 is larger than the opening angle β of second notional cone K2.

First cylindrical bearing surface 74*g* extends axially from axial end 74*g*1 located closer to the protrusion structure, to axial end 74*g*2 located closer to free longitudinal end 74*k*. The distance between axial end 74*g*2, located closer to free longitudinal end 74*k*, of first cylindrical bearing surface 74*g* and free longitudinal end 74*k* can itself be shorter than the distance between the two axial ends 74*h*2 and 74*g*2 located closer to free longitudinal end 74*k*.

A similar design is selected for the conformation of the counterpart centering configuration in the form of counterpart centering recess 74*b*. Counterpart centering recess 74*b* preferably has two recess portions 74*b*1 and 74*b*2 located axially one behind another in a protrusion direction of bearing stem 74*a*, i.e. the direction in which centering stem 60*a* penetrates into counterpart centering recess 74*b*.

With milling drum 32 in the operational state, the larger-diameter main centering recess portion 74*b*1, which is located closer to drive axial end 32*a* of milling drum 32, provides the main centering, relative to drive configuration 46, of bearing configuration 90 and thus of that axial portion of milling drum 32 which is located closer to retention axial end 32*b*. The smaller-diameter pre-centering recess portion 74*b*2, located farther from drive axial end 32*a*, likewise provides pre-centering of milling drum 32 relative to drive configuration 46 before milling drum 32 reaches its operating position, for example in the preparation position located axially remotely from the operating position.

Centering stem 60a preferably also comprises two axial portions having diameters of different sizes, the larger-diameter one of which, constituting main centering stem portion, is in abutment against the circumferential wall of main centering recess portion 74b1 when milling drum 32 is in the operating position. The smaller-diameter axial portion of centering stem 60a, constituting a pre-centering stem portion, has already begun to enter pre-centering recess portion 74b2 before the main centering stem portion is introduced into main centering recess portion 74b1. A larger radial clearance exists between the smaller-diameter pre-centering stem portion of centering stem 60a and the circumferential wall of pre-centering recess portion 74b2 than between the larger-diameter main centering stem portion of centering stem 60a and the circumferential wall of main centering recess portion 74b1. Centering recess 74b can thus be securely and reliably centered on centering stem 60a even if, at the beginning of a sliding-on movement of milling drum 32 onto drive configuration 46, a large positional discrepancy exists between bearing stem axis Z and a central longitudinal axis of centering stem 60a.

To allow even a large positional discrepancy of this kind to be managed at the beginning of the sliding-on movement, pre-centering recess portion 74b2 is preferably embodied to be axially longer than main centering recess portion 74b1. Pre-centering recess portion 74b2 is preferably axially longer than main centering recess portion 74b1 by an amount that is greater than the difference value of the radial spacing sb between the two circumferential walls of centering recess portions 74b1 and 74b2. The axial spacing ib of the two centering recess portions 74b1 and 74b2 from one another is also preferably smaller than the radial spacing sb between their circumferential walls.

Centering recess 74b therefore also tapers from its longitudinal end, located closer to drive axial end 32a, toward internal thread 74e. The degree of taper of centering recess 74b decreases with increasing axial distance from its opening located closer to drive axial end 32a.

In accordance with a preferred embodiment depicted in FIGS. 11A and 11B, the taper of centering recess 74b is preferably such that a first virtual cone K3, which abuts respectively against the edges, located axially closest to drive axial end 32a, R1 of main centering recess portion 74b1 and R2 of pre-centering recess portion 74b2, has a larger opening angle γ than a second virtual cone K4 that abuts on the one hand against edge R2, located axially closest to drive axial end 32a, of pre-centering recess portion 74b2, and on the other hand against an edge R3, located closest to drive axial end 32a, of a radial shoulder 74d1, following pre-centering recess portion 74b2 axially in a penetration direction of centering stem 60a, of centering recess 74b or of passthrough opening 74d of which centering recess 74b is a part. The opening angle of second virtual cone K4 is labeled δ in FIG. 11b.

In the exemplifying embodiment depicted, the opening angle γ of first virtual cone K3 is slightly (between approximately 2° and 7°) larger than the opening angle α of first notional cone K1 described above. The opening angle δ of second virtual cone K4 is furthermore slightly (approximately 2° to 4°) smaller than the opening angle β of second notional cone K2 described above.

Figure 14:
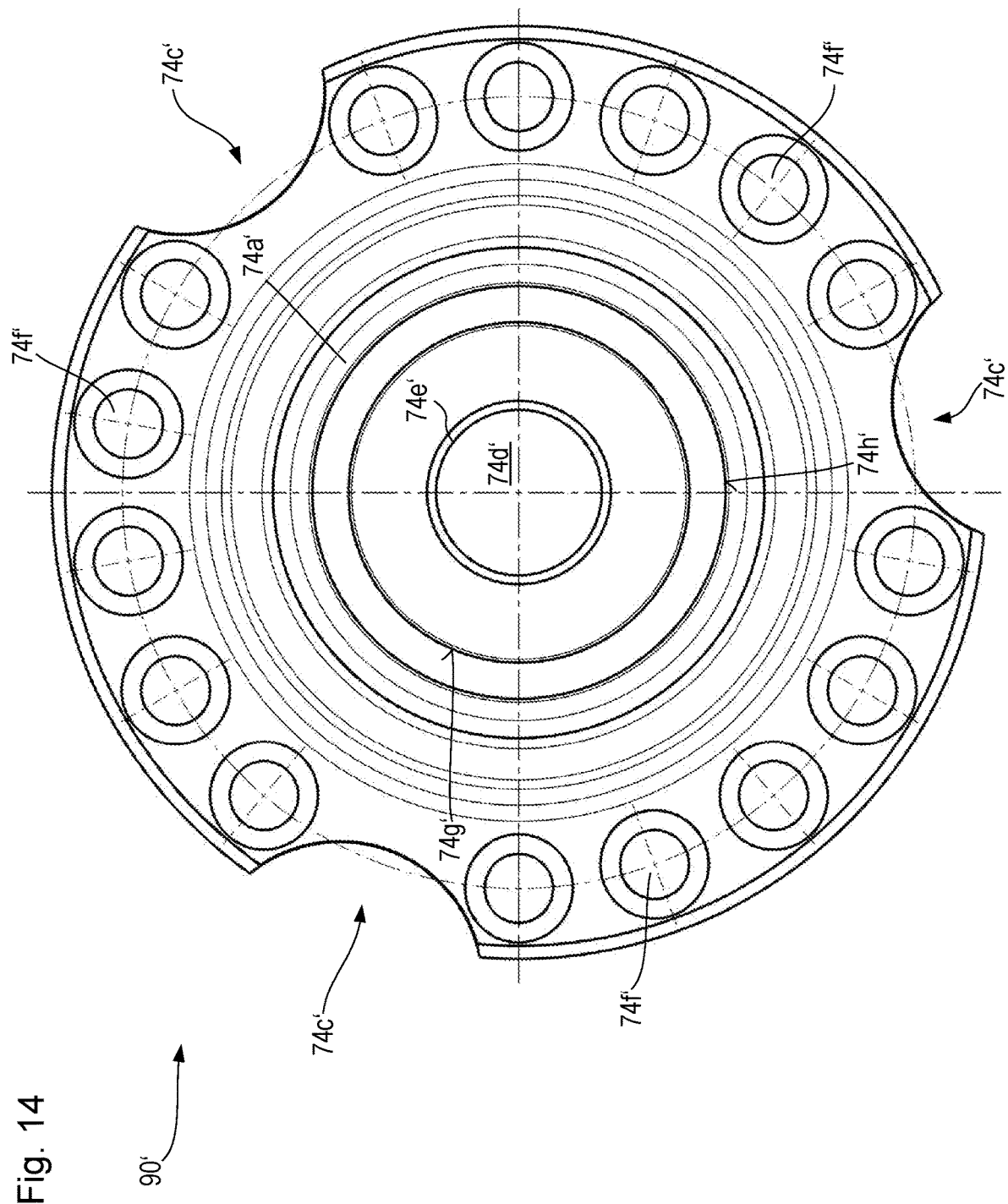
FIG. 14 is a plan view of the bearing component of FIGS. 13A and 13B.

FIGS. 13 and 14 depict a modified embodiment of bearing component 90.

Figure 12:
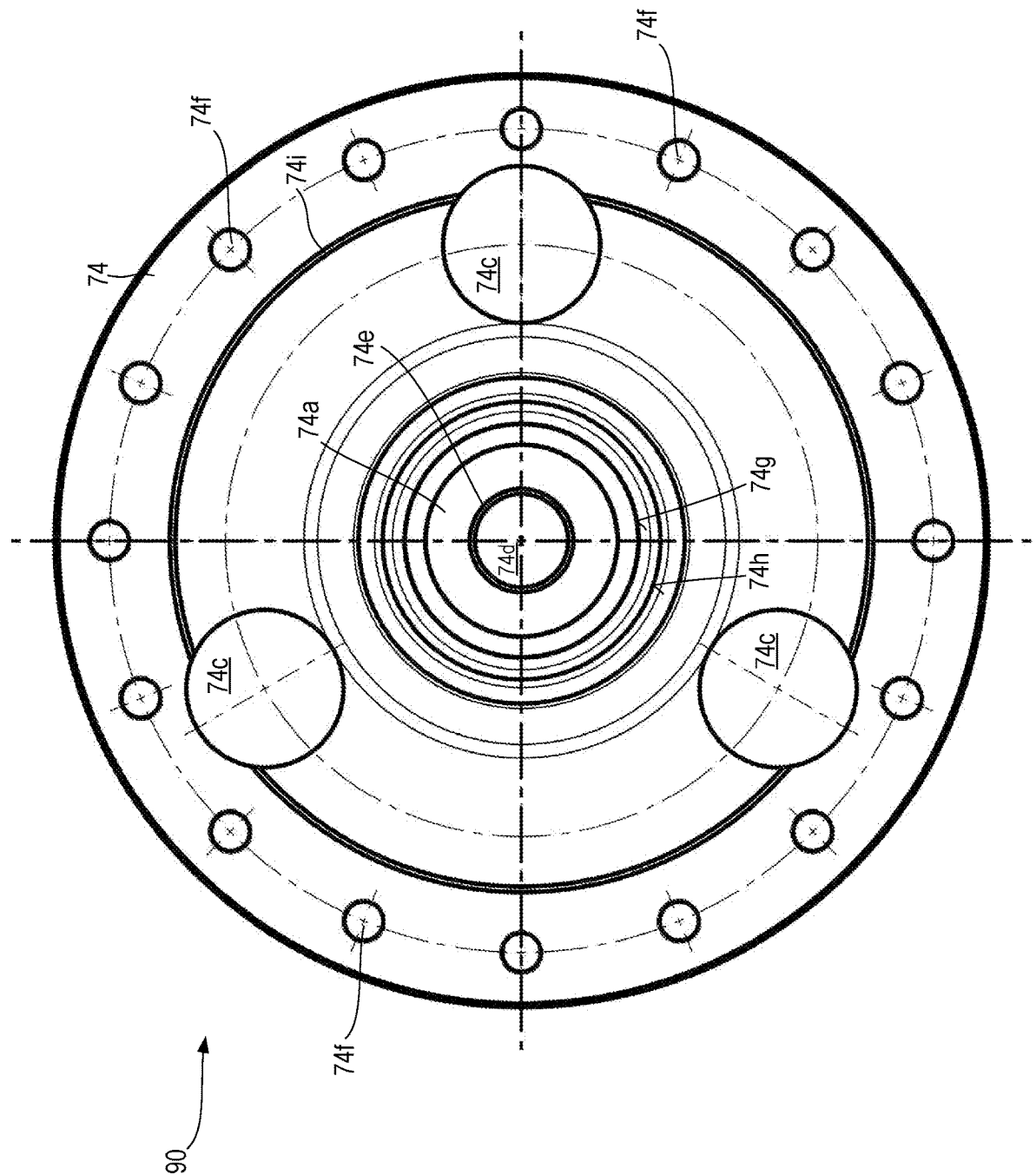
FIG. 12 is a plan view of the bearing component of FIGS. 11A and 11B.

Components and component portions identical and functionally identical to those in FIGS. 11 and 12 have the same reference characters in FIGS. 13 and 14 but with an apostrophe added. The modified embodiment of FIGS. 13 and 14 will be explained below only insofar as it differs from the embodiment of FIGS. 11 and 12, to the description of which reference is otherwise additionally made for an explanation of the embodiment of FIGS. 13 and 14.

In the axial portion that extends from longitudinal end 74h1', located closer to the drive axial end, of second cylindrical bearing surface 74h' to free axial longitudinal end 74k', bearing stem 74a' of bearing component 90' has qualitatively the same external conformation as bearing stem 74a of bearing component 90. The statements made with regard to bearing stem 74a of bearing component 90 of FIGS. 11 and 12 therefore also apply to bearing stem 74a' of bearing component 90' of FIGS. 13 and 14.

Centering recess 74b' also has qualitatively the same conformation as centering recess 74b of bearing component 90 of FIGS. 11 and 12. Here as well, the statements made with regard to bearing component 90 apply without modification to bearing component 90'.

An essential difference between bearing components 90 and 90' is that connecting flange 74' of bearing component 90' has a smaller diameter and a radial step 74m'.

Radial step 74m' is functionally similar to protrusion 74i of bearing component 90, but differs appreciably in terms of where it is arranged. A protrusion 74i is therefore not embodied on bearing component 90' between connecting flange 74' and bearing stem 74a' that protrudes from it.

As a result of radial step 74m' embodied on that side of connecting flange 74' which is located closer to drive axial end 32a, bearing component 90' can be inserted, as depicted in FIG. 13A, into a complementarily stepped recess of connecting ring 70' in such a way that the end face, located closer to retention axial end 32b, of connecting flange 74', from which bearing stem 74a' axially protrudes, can be arranged flush with an end face, facing in the same direction, of connecting ring 70'. Radial step 74m' can furthermore be axially dimensioned in such a way that that longitudinal end of bearing component 90' which is located closer to drive axial end 32a is also arranged flush with that end face of connecting ring 70 which faces in the same direction.

Because of the smaller radial extent of connecting flange 74', recesses 74c' are not embodied entirely in bearing component 90' but instead are apparent there only as arc-shaped sub-recesses that form a complete recess 74c, into which a pin 80 of drive configuration 46 can penetrate in torque-transferring fashion, only when supplemented with corresponding complementary sub-recesses in connecting ring 70'.

Again because of the smaller radial extent of connecting flange 74', passthrough openings 74f for fastening bearing component 90' on connecting ring 70' are located radially farther inward, so that they are only in portions arranged equidistantly from one another in a circumferential direction. No passthrough openings 74f' are provided where sub-recesses 74c' are embodied.

Leaving aside the earth working machine claimed later on, the subject matters disclosed below, relating to a replaceable milling drum for an earth working machine, are also of interest to the Applicant as being worthy of protection. The Applicant reserves the right to claim one or several of the subject matters defined below at a later point in time:

1. A replaceable milling drum (32; 232) for an earth working machine (10) such as a road milling machine, recycler, stabilizer, or surface miner, which extends between a drive axial end (32a) and a retention axial end (32b; 232b) located oppositely from the drive axial end (32a) and is embodied to radially externally surround a drive configuration (46; 246) of the earth working machine (10) in the operationally mounted state, the milling drum (32; 132; 232) being retainable in its operational position, against axial displacement, by a central bolt arrangement (78; 278), accessible in the region of its retention axial end (32b; 232b), having a bolt axis collinear with the central apparatus axis (R) of the milling drum (32; 232), a bearing stem (74a; 74a'; 274a) located in a region closer to the retention axial end (32b; 232b) than to the drive axial end (32a) being provided, which stem protrudes from a protrusion structure (74; 74'; 274) carrying it and extends in an axial direction taperingly in a direction away from the drive axial end (32a), the bearing stem (74a; 74a'; 274a) comprising at least two cylindrical bearing surfaces (74g, 74h; 74g', 74h') at an axial distance from one another with respect to the central apparatus axis (R), which, with the milling drum (32; 232) in the operational state, are surrounded with zero clearance by hollow-cylindrical counterpart bearing surfaces of an earth working machine-side non-locating bearing (76; 276), the cylindrical bearing surface (74g; 74g') located axially farther from the protrusion structure (74; 74'; 274) having a smaller diameter than the cylindrical bearing surface (74h; 74h') located axially closer to the protrusion structure (74; 74'; 274), and/or the milling drum (32; 232) comprising, at a region located closer to the retention axial end (32b; 132b; 232b) than to the drive axial end (32a), a centering recess (74b; 74b'; 274), embodied for positive centering engagement and connected rigidly to the milling drum (32; 132; 232), which tapers in a direction away from the drive axial end (32a), the centering recess (74b; 74b'; 274) being embodied with an opening angle (γ, δ) that decreases in steps along its taper.

2. The replaceable milling drum (32; 232) according to subject matter 1, refined in that the centering recess (74b; 74b'; 274) is embodied on the bearing stem (74a; 74a'; 274a).

3. The replaceable milling drum (32; 232) according to subject matter 1 or 2, refined in that the axially tapering conformation of the bearing stem (74a; 74a') is such that the opening angle (α, β) of two notional enveloping cones (K1, K2), which respectively abut tangentially against two osculating circles (S1, S2, S3, S4) located with an axial spacing from one another on the surface of bearing stem (74a; 74a') and surround an axial portion, located between the osculating circles (S1, S2, S3, S4), of the bearing stem (74a' 74a'), is smaller for cones (K2) of osculating circle pairs (S3, S4) located closer to the protrusion structure (74, 74').

4. The replaceable milling drum (32; 232) according to subject matter 3, refined in that the opening angle (α) of a first notional cone (K1), whose first osculating circle (S1), located farther from the protrusion structure (74; 74'), is located at the axial longitudinal end (74k; 74k') located remotely from the protrusion structure (74; 74'), and whose second osculating circle (S2), located closer to the protrusion structure (74; 74'), is located axially between the first osculating circle (S1) and that axial longitudinal end (74g2; 74g2') of the first cylindrical surface (74g; 74g') which is located closer to the free bearing stem longitudinal end (74k; 74k'), is at least 1.5 times, preferably at least 2.5 times as large as the opening angle (β) of a second notional cone (K2) whose first osculating circle (S3), located farther from the protrusion structure (74; 74'), is located at that axial longitudinal end (74g2; 74g2') of the first cylindrical bearing surface (74g; 74g') which is located closer to the free bearing stem longitudinal end (74k; 74k').

5. The replaceable milling drum (32; 232) according to subject matter 4, refined in that the opening angle of the second notional cone is equal to 5° to 15°, particularly preferably 8° to 13°.

6. The replaceable milling drum (32; 232) according to one of the preceding subject matters, refined in that the centering recess (74b; 74b'; 274) comprises a main centering recess portion (74b1; 74b1') located closer to the drive axial end (32a) and a pre-centering recess portion (74b2; 74b2') located farther from the drive axial end (32a), such that a first virtual cone (K3) that abuts respectively against the edges (R1, R2), located axially closest to the drive axial end (32a), of the main centering recess portion (74b1; 74b1') and of the pre-centering recess portion (74b2; 74b2') has a larger opening angle (γ) than a second virtual cone (K4) that abuts on the one hand against the edge (R2), located axially closest to the drive axial end (32a), of the pre-centering recess portion (74b2; 74b2') and on the other hand against an edge (R3), located closest to the drive axial end, of a recess (74d; 74d') that axially follows the pre-centering recess portion (74b2; 74b2') in a direction away from the drive axial end (32a) and of which the centering recess (74b; 74b') is a part.

7. The replaceable milling drum (32; 232) according to subject matter 6, refined in that the opening angle (γ) of the first virtual cone (K3) is approximately 3 to 6 times, particularly preferably 4 to 5 times, larger than the opening angle (δ) of the second virtual cone (K4).

8. The replaceable milling drum (32; 232) according to subject matter 6 or 7, refined in that the opening angle (γ) of the first virtual cone (K3) is equal to between 20° and 40°, particularly preferably between 25° and 35°.

9. The replaceable milling drum (32; 232) according to one of subject matters 6 to 8, including subject matter 4, refined in that the opening angle (γ) of the first virtual cone (K3) is larger than the opening angle (α) of the first notional cone (K1) described above.

10. The replaceable milling drum (32; 232) according to one of subject matters 6 to 9, including subject matter 4, wherein the opening angle (δ) of the second virtual cone (K4) is smaller than the opening angle (β) of the second notional cone (K2) described above.

The invention claimed is:

1. A replaceable milling drum for an earth working machine, comprising:
   a milling drum tube including a drive axial end and a retention axial end located oppositely from the drive axial end, the milling drum tube having a drive axis about which the milling drum tube is rotatable;
   a protrusion structure fixed to the milling drum tube and located closer to the retention axial end than to the drive axial end; and
   a bearing stem protruding from the protrusion structure axially away from the drive axial end, the bearing stem having an outer surface spaced from any other part of the protrusion structure and the milling drum tube, the outer surface including at least first and second cylindrical bearing surfaces axially spaced from each other, a furthest one of the cylindrical bearing surfaces from the drive axial end having a smaller diameter than a next furthest one of the cylindrical bearing surfaces from the drive axial end, the bearing stem having a central opening therethrough co-axial with the drive axis.

2. The replaceable milling drum of claim 1, wherein:
   an axially tapering conformation of the outer surface of the bearing stem is such that an opening angle (α, β) of first and second notional enveloping cones (K1, K2), which respectively abut tangentially against two osculating circles (S1, S2, S3, S4) located with an axial spacing from one another on the outer surface of the bearing stem and surround an axial portion, located between the osculating circles (S1, S2, S3, S4), of the bearing stem, is smaller for the second notional enveloping cone (K2) of osculating circle pair (S3, S4) located closer to the protrusion structure.

3. The replaceable milling drum of claim 2, wherein:
the opening angle ($\alpha$) of the first notional enveloping cone (K1), whose first osculating circle (S1), located farther from the protrusion structure, is located at an axial longitudinal free end of the bearing stem located remotely from the protrusion structure, and whose second osculating circle (S2), located closer to the protrusion structure is located axially between the first osculating circle (S1) and an axial longitudinal end of the first cylindrical bearing surface which is located closer to the axial longitudinal free end of the bearing stem, is at least 1.5 times as large as the opening angle ($\beta$) of the second notional enveloping cone (K2) whose first osculating circle (S3), located farther from the protrusion structure is located at the axial longitudinal end of the first cylindrical bearing surface which is located closer to the axial longitudinal free end of the bearing stem.

4. The replaceable milling drum of claim 3, wherein:
the opening angle ($\alpha$) of the first notional enveloping cone (K1) is at least 2.5 times as large as the opening angle ($\beta$) of the second notional enveloping cone (K2).

5. The replaceable milling drum of claim 3, wherein:
the opening angle ($\beta$) of the second notional enveloping cone (K2) is in a range of from about 5° to about 15°.

6. The replaceable milling drum of claim 3, wherein:
the opening angle ($\beta$) of the second notional enveloping cone (K2) is in a range of from about 8° to about 13°.

7. The replaceable milling drum of claim 1, wherein:
the bearing stem further includes a centering recess open toward the drive axial end and including an opening angle decreasing in steps so that the centering recess tapers in a direction away from the drive axial end, the centering recess forming a portion of the central opening.

8. The replaceable milling drum of claim 7, wherein:
the centering recess comprises a main centering recess portion located closer to the drive axial end and a pre-centering recess portion located farther from the drive axial end, such that a first virtual cone (K3) that abuts respectively against edges (R1, R2), located axially closest to the drive axial end, of the main centering recess portion and of the pre-centering recess portion has a larger opening angle ($\gamma$) than a second virtual cone (K4) that abuts on the one hand against the edge (R2), located axially closest to the drive axial end of the pre-centering recess portion and on the other hand against an edge (R3), located closest to the drive axial end, of a recess that axially follows the pre-centering recess portion in a direction away from the drive axial end and of which the centering recess is a part.

9. The replaceable milling drum of claim 8, wherein:
the opening angle ($\gamma$) of the first virtual cone (K3) is in a range of from about 3 to about 6 times larger than the opening angle ($\delta$) of the second virtual cone (K4).

10. The replaceable milling drum of claim 9, wherein:
the opening angle ($\gamma$) of the first virtual cone (K3) is in a range of from about 20° to about 40°.

11. The replaceable milling drum of claim 9, wherein:
the opening angle ($\gamma$) of the first virtual cone (K3) is in a range of from about 25° to about 35°.

12. The replaceable milling drum of claim 8, wherein:
the opening angle ($\gamma$) of the first virtual cone (K3) is in a range of from about 4 to about 5 times larger than the opening angle ($\delta$) of the second virtual cone (K4).

13. The replaceable milling drum of claim 7, wherein:
an axially tapering conformation of the outer surface of the bearing stem is such that an opening angle ($\alpha$, $\beta$) of first and second notional enveloping cones (K1, K2), which respectively abut tangentially against two osculating circles (S1, S2, S3, S4) located with an axial spacing from one another on the outer surface of bearing stem and surround an axial portion, located between the osculating circles (S1, S2, S3, S4), of the bearing stem, is smaller for the second notional enveloping cone (K2) of the osculating circle pair (S3, S4) located closer to the protrusion structure; and
an opening angle ($\beta$) of the first virtual cone (K3) is larger than the opening angle ($\alpha$) of the first notional enveloping cone (K1).

14. The replaceable milling drum of claim 13, wherein:
an opening angle ($\delta$) of the second virtual cone (K4) is smaller than the opening angle ($\beta$) of the second notional enveloping cone (K2).

15. A replaceable milling drum for an earth working machine, comprising:
a milling drum tube including a drive axial end and a retention axial end located oppositely from the drive axial end, the milling drum tube having a drive axis about which the milling drum tube is rotatable;
a protrusion structure fixed to the milling drum tube and located closer to the retention axial end than to the drive axial end; and
a bearing stem protruding from the protrusion structure axially away from the drive axial end, the bearing stem including a central opening therethrough co-axial with the drive axis, the bearing stem further including a centering recess open toward the drive axial end and including an opening angle decreasing in steps so that the centering recess tapers in a direction away from the drive axial end, the centering recess forming a portion of the central opening.

16. The replaceable milling drum of claim 15, wherein:
the centering recess comprises a main centering recess portion located closer to the drive axial end and a pre-centering recess portion located farther from the drive axial end, such that a first virtual cone (K3) that abuts respectively against edges (R1, R2), located axially closest to the drive axial end, of the main centering recess portion and of the pre-centering recess portion has a larger opening angle ($\gamma$) than a second virtual cone (K4) that abuts on the one hand against the edge (R2), located axially closest to the drive axial end of the pre-centering recess portion and on the other hand against an edge (R3), located closest to the drive axial end, of a recess that axially follows the pre-centering recess portion in a direction away from the drive axial end and of which the centering recess is a part.

17. The replaceable milling drum of claim 16, wherein:
an opening angle ($\gamma$) of the first virtual cone (K3) is in a range of from about 3 to about 6 times larger than the opening angle ($\delta$) of the second virtual cone (K4).

18. The replaceable milling drum of claim 17, wherein:
the opening angle (γ) of the first virtual cone (K3) is in a range of from about 20° to about 40°.
19. The replaceable milling drum of claim 17, wherein:
the opening angle (γ) of the first virtual cone (K3) is in a range of from about 25° to about 35°.
20. The replaceable milling drum of claim 15, wherein:
an opening angle (γ) of the first virtual cone (K3) is in a range of from about 4 to about 5 times larger than the opening angle (δ) of the second virtual cone (K4).

* * * * *